(12) United States Patent
Ogata et al.

(10) Patent No.: US 10,665,229 B2
(45) Date of Patent: May 26, 2020

(54) INFORMATION PROCESSING DEVICE, INFORMATION PROCESSING METHOD, AND PROGRAM

(71) Applicant: SONY CORPORATION, Tokyo (JP)

(72) Inventors: Takashi Ogata, Tokyo (JP); Masanori Katsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 15/566,876

(22) PCT Filed: Mar. 2, 2016

(86) PCT No.: PCT/JP2016/056481
§ 371 (c)(1),
(2) Date: Oct. 16, 2017

(87) PCT Pub. No.: WO2016/199464
PCT Pub. Date: Dec. 15, 2016

(65) Prior Publication Data
US 2018/0108347 A1    Apr. 19, 2018

(30) Foreign Application Priority Data
Jun. 12, 2015  (JP) .................. 2015-118930

(51) Int. Cl.
*G10L 15/18*   (2013.01)
*G06F 16/332*  (2019.01)
(Continued)

(52) U.S. Cl.
CPC .......... *G10L 15/1815* (2013.01); *G06F 16/00* (2019.01); *G06F 16/3329* (2019.01);
(Continued)

(58) Field of Classification Search
CPC ................ G10L 15/1815; G10L 15/26; G10L 2015/228; G06F 17/30; G06F 17/30654; G06Q 50/10
See application file for complete search history.

(56) References Cited

U.S. PATENT DOCUMENTS 6,338,065 B1 *  1/2002  Takahashi .............. G06Q 10/06
6,721,704 B1 *  4/2004  Strubbe .................. G10L 25/48
                                                  379/88.01
(Continued)

FOREIGN PATENT DOCUMENTS

JP    2001-188787 A    7/2001
JP    2001-195430 A    7/2001

OTHER PUBLICATIONS

Oct. 9, 2018, European Search Report issued for related EP application No. 16807171.0.
(Continued)

*Primary Examiner* — Fariba Sirjani
(74) *Attorney, Agent, or Firm* — Paratus Law Group, PLLC

(57) ABSTRACT

There is provided an information processing device that appropriately presents a topic in consideration of a behavior of a user presenting the topic. The information processing device includes: a topic generation unit configured to generate topics with a conversation partner on the basis of a comparison result between a certain behavior of a user and comparison information regarding the behavior; and a topic suggestion unit configured to decide a topic candidate to be suggested to the user from the generated topics.

23 Claims, 36 Drawing Sheets

(51) Int. Cl.
  *G06Q 50/10* (2012.01)
  *G06F 16/00* (2019.01)
  *G10L 15/26* (2006.01)
  *G10L 15/22* (2006.01)

(52) U.S. Cl.
  CPC .............. *G06Q 50/10* (2013.01); *G10L 15/26* (2013.01); *G10L 2015/228* (2013.01)

(56) References Cited

U.S. PATENT DOCUMENTS

| | | | | |
|---|---|---|---|---|
| 8,255,421 B2* | 8/2012 | Maeda | ................ | G06F 16/9024 |
| | | | | 707/791 |
| 2011/0029534 A1* | 2/2011 | Maeda | ................ | G06F 16/9024 |
| | | | | 707/738 |
| 2012/0066231 A1* | 3/2012 | Petersen | ................ | G06Q 30/02 |
| | | | | 707/748 |
| 2012/0296991 A1* | 11/2012 | Spivack | ................ | G06Q 10/10 |
| | | | | 709/206 |
| 2013/0097262 A1* | 4/2013 | Dandison | .............. | H04L 51/066 |
| | | | | 709/206 |
| 2015/0156268 A1* | 6/2015 | Lev | ......................... | H04L 51/32 |
| | | | | 709/204 |
| 2015/0261867 A1* | 9/2015 | Singal | ............... | G06F 17/30867 |
| | | | | 707/722 |
| 2015/0281371 A1* | 10/2015 | Bacon | .................... | H04W 4/50 |
| | | | | 709/228 |
| 2015/0360695 A1* | 12/2015 | Gluck | .................. | B60W 40/08 |
| | | | | 455/414.1 |
| 2015/0365448 A1* | 12/2015 | Stifelman | ............. | H04L 65/403 |
| | | | | 709/204 |
| 2016/0180737 A1* | 6/2016 | Clark | .................. | G06F 17/2785 |
| | | | | 434/236 |
| 2016/0195402 A1* | 7/2016 | Adderly | .................. | H04L 51/04 |
| | | | | 701/538 |
| 2016/0210563 A1* | 7/2016 | Bhagwat | ............... | G06F 3/0481 |
| 2016/0283465 A1* | 9/2016 | Patris | .................... | G06N 3/008 |
| 2016/0283816 A1* | 9/2016 | Paradkar | ............... | G06K 9/4604 |
| 2018/0343219 A1* | 11/2018 | Anderson | ................. | H04L 51/16 |
| 2019/0258560 A1* | 8/2019 | Weissinger | ......... | G06F 11/3409 |

OTHER PUBLICATIONS

Go Tanaka et al., Proposal of Face-to-Face Communication Supporting System Using Human Activity Estimation, ISSN 1882-0840 IPSJ Symposium Series vol. 2012, No. 1, Jul. 4-6, 2012, pp. 2359-2366, Japan.

Akira Imayoshi et al., Detection of Active Parts of Conversation in Real Time Using Laughter, Aug. 22, 2011, pp. 551-554, Japan.

* cited by examiner

FIG. 6
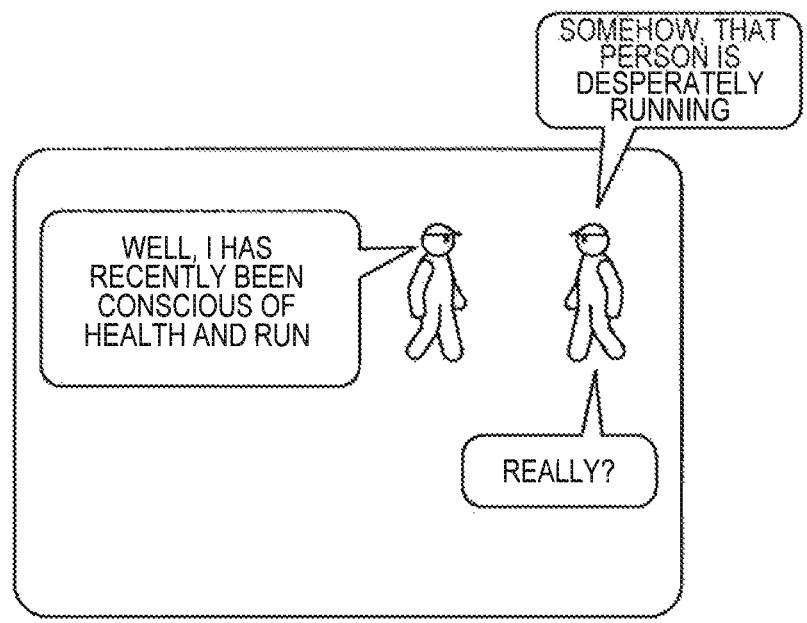
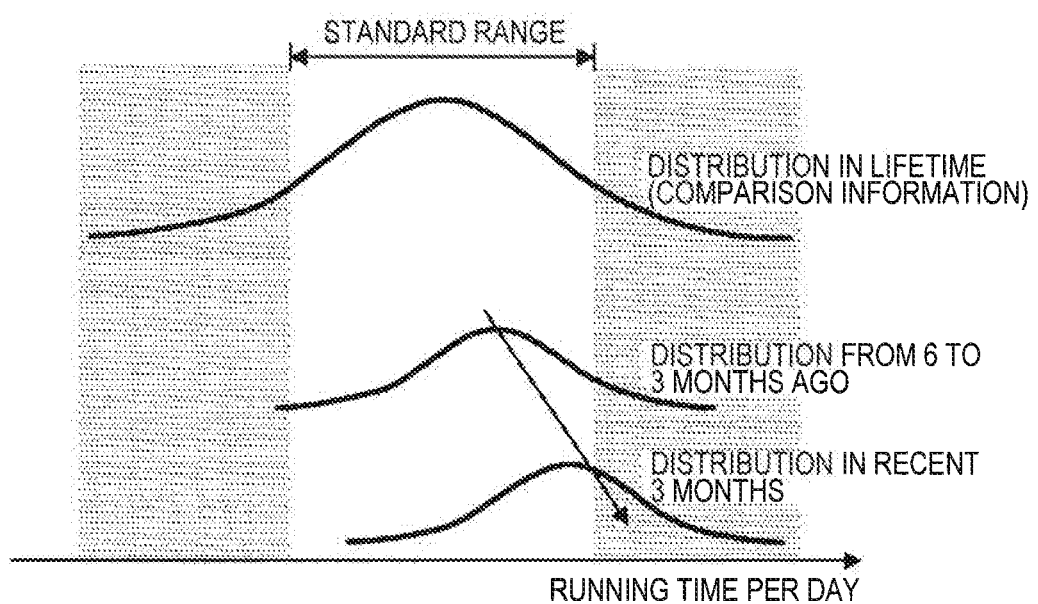

FIG. 7
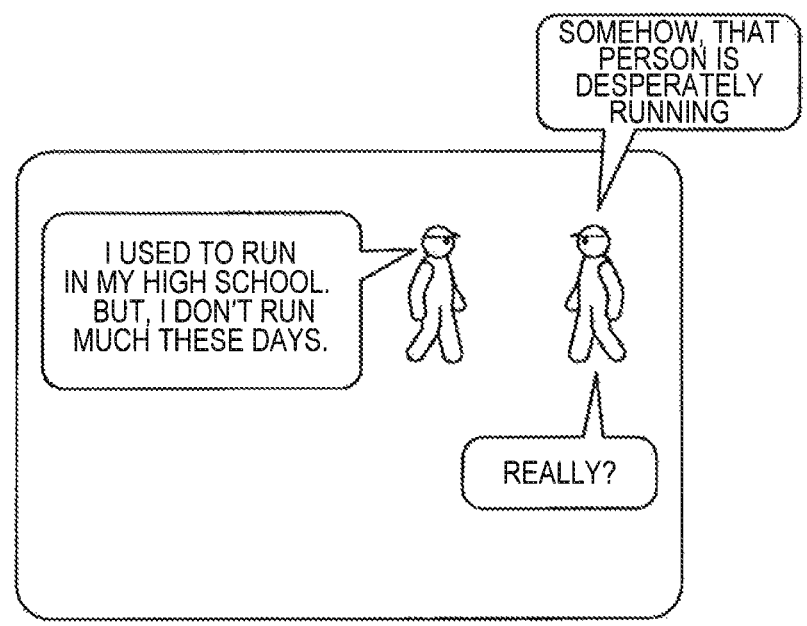
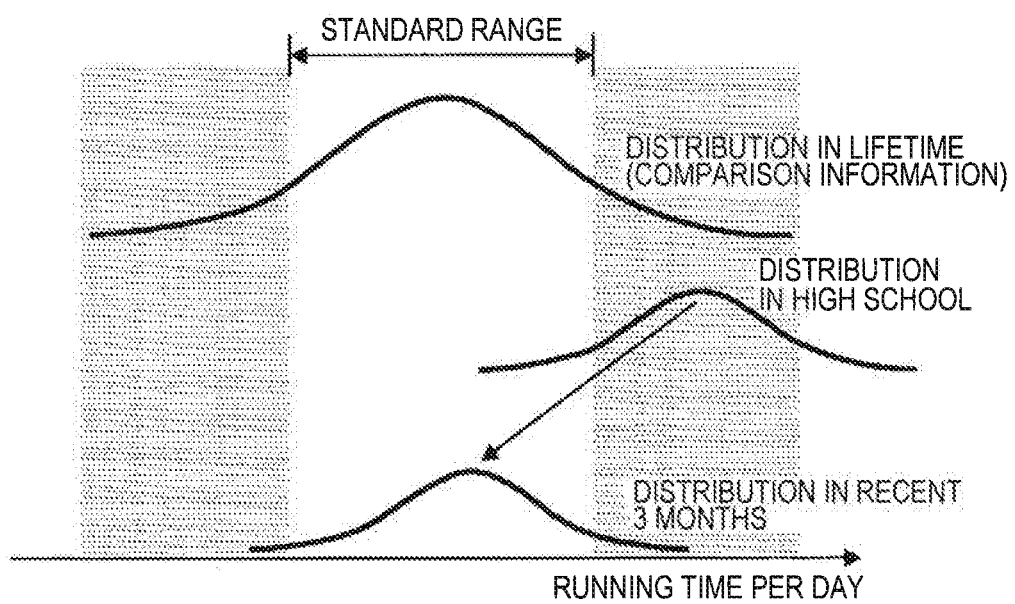

FIG. 9
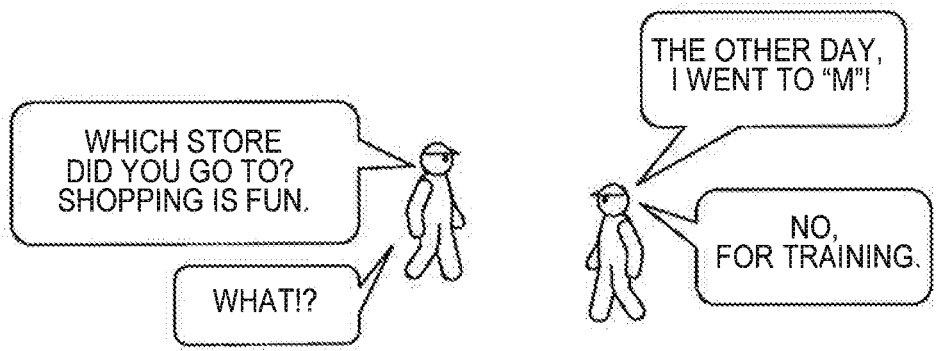
DISTRIBUTION OF BEHAVIORS DONE IN "M"
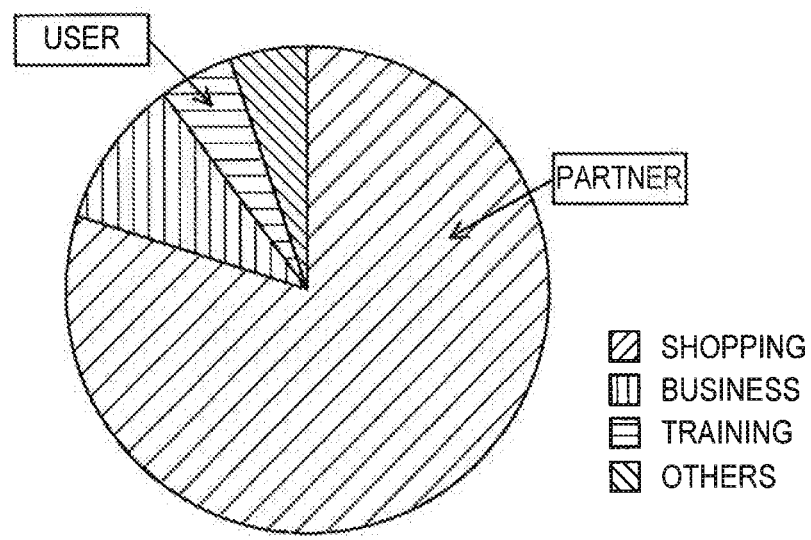

FIG. 10
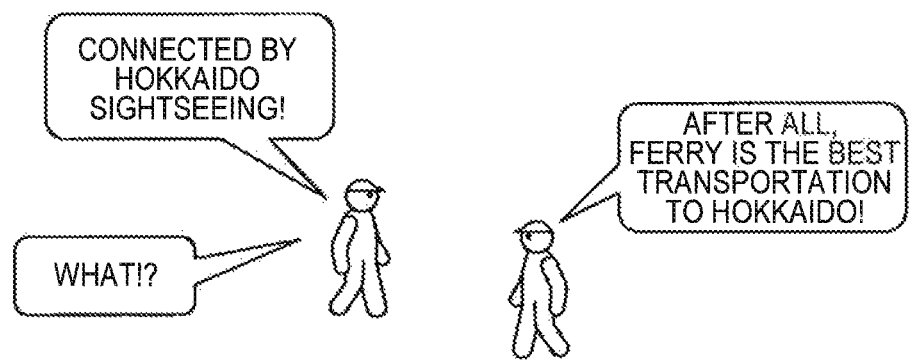
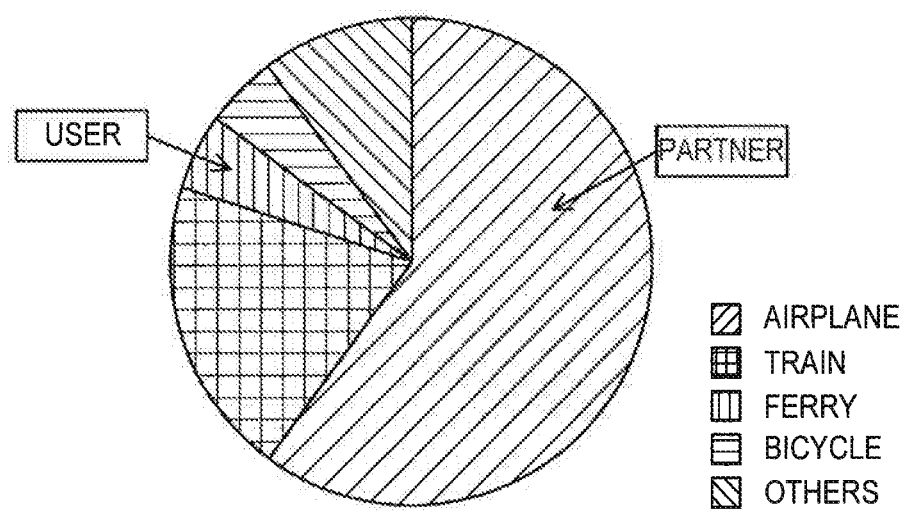

FIG. 14

| LATITUDE AND LONGITUDE ~142a | PLACE NAME ~142b | PLACE CATEGORY ~142c | BEHAVIOR ~142d | PROFILE ~142e | PROFILE CATEGORY ~142f |
|---|---|---|---|---|---|
| ....., ..... | ABC SKI RESORT | SKI RESORT (SLOPE OF MOUNTAIN) | JUMP, TURN | SNOW SPORTS | ACTIVE SPORTS |
| ....., ..... | TOP SKI RESORT | SKI RESORT (SLOPE OF MOUNTAIN) | WALKING | TREKKING, MOUNTAIN CLIMBING | ACTIVE SPORTS |
| ....., ..... | ZZ SKI RESORT | SKI RESORT (SLOPE OF MOUNTAIN) | WALKING | TREKKING, MOUNTAIN CLIMBING | ACTIVE SPORTS |
| ....., ..... | KUGENUMA KAIGAN | BEACH | SITTING | FISHING | OUTDOOR |
| ....., ..... | KUGENUMA KAIGAN | BEACH | TURN | SURFING | ACTIVE SPORTS |
| ....., ..... | KUJUKURIHAMA | BEACH | TURN | SURFING | ACTIVE SPORTS |

User.A    144A

| STAY POSITION TRANSITION (LATITUDE AND LONGITUDE) 144a | STAY PLACE TRANSITION (PLACE NAME) 144b | TRANSPORTATION 144c | FEATURE BEHAVIOR INFORMATION 144d | TEMPORAL INFORMATION (SEASON/TIME) 144e | PROFILE 144f | PROFILE CATEGORY 144g |
|---|---|---|---|---|---|---|
| from: ······ <br> to: ······ | HOME-OFFICE | TRAIN | — | WEEKDAY | PERSON WHO USES TRAIN FOR COMMUTATION | TRAIN COMMUTER |
| from: ······ <br> to1/from1:····· <br> to2: ······ | OFFICE-STAY A1-HOME | TRAIN | — | EVENING | PERSON WHO STOPS BY ON WAY FROM OFFICE | STOPPING-BY PERSON |
| from: ······ <br> to: ······ | HOME-STORE | AUTOMOBILE | — | HOLIDAY | PERSON WHO USES AUTOMOBILE FOR SHOPPING | DRIVE |
| from: ······ <br> to: ······ | HOME-STAY A2 | AUTOMOBILE | ROUND TRIP IN ONE DAY | HOLIDAY | PERSON WHO OFTEN DRIVES FOR ONE-DAY TRIP | DRIVE |
| from: ······ <br> to: ······ | HOME-STAY A3 | AUTOMOBILE | ROUND TRIP IN ONE DAY | HOLIDAY | | DRIVE |
| from: ······ <br> to: ······ | HOME-STAY A4 | AUTOMOBILE | ROUND TRIP IN ONE DAY | HOLIDAY | | DRIVE |

FIG. 16

User.B
144B

| STAY POSITION TRANSITION (LATITUDE AND LONGITUDE) 144a | STAY PLACE TRANSITION (PLACE NAME) 144b | TRANSPORTATION 144c | FEATURE BEHAVIOR INFORMATION 144d | TEMPORAL INFORMATION (SEASON/TIME) 144e | PROFILE 144f | PROFILE CATEGORY 144g |
|---|---|---|---|---|---|---|
| from: ·····<br>to: ····· | HOME-OFFICE | TRAIN | — |  | PERSON WHO USES TRAIN FOR COMMUTATION | TRAIN COMMUTER |
| from: ·····<br>to1/from1: ·····<br>to2: ····· | OFFICE-STAY B1-HOME | TRAIN | — | WEEKDAY EVENING |  | STOPPING-BY PERSON |
| from: ·····<br>to1/from1: ·····<br>to2: ····· | OFFICE-STAY B2-HOME | TRAIN | — | WEEKDAY EVENING | PERSON WHO OFTEN STOPS BY ON WAY FROM OFFICE | STOPPING-BY PERSON |
| from: ·····<br>to1/from1: ·····<br>to2: ····· | OFFICE-STAY B3-HOME | TRAIN | — | WEEKDAY EVENING |  | STOPPING-BY PERSON |
| from: ·····<br>to: ····· | HOME-STORE | WALKING | — | HOLIDAY | PERSON WHO DO SHOPPING NEARBY | LOCAL PERSON |

FIG. 17

User.C                                                                                                                          144C

| STAY POSITION TRANSITION (LATITUDE AND LONGITUDE) 144a | STAY PLACE TRANSITION (PLACE NAME) 144b | TRANSPORTATION 144c | FEATURE BEHAVIOR INFORMATION 144d | TEMPORAL INFORMATION (SEASON/TIME) 144e | PROFILE 144f | PROFILE CATEGORY 144g |
|---|---|---|---|---|---|---|
| from: ····· to: ····· | HOME-OFFICE | AUTOMOBILE | — | WEEKDAY | PERSON WHO USES TRAIN FOR COMMUTATION | AUTOMOBILE COMMUTER |
| from: ····· to1/from1: ····· to2: ····· | OFFICE-STAY C1-OFFICE | AUTOMOBILE | — | WEEKDAY DAYTIME | | ROUND-MAKING PERSON |
| from: ····· to1/from1: ····· to2: ····· | OFFICE-STAY C2-OFFICE | AUTOMOBILE | — | WEEKDAY DAYTIME | PERSON WHO MAKES ROUNDS WITH AUTOMOBILE | ROUND-MAKING PERSON |
| from: ····· to1/from1: ····· to2: ····· | OFFICE-STAY C3-OFFICE | AUTOMOBILE | — | WEEKDAY DAYTIME | | ROUND-MAKING PERSON |
| from: ····· to: ····· | HOME-STAY C4 | TRAIN | — | HOLIDAY | PERSON WHO GOES OUT WITH TRAIN ON HOLIDAY | HOLIDAY-TRIP PERSON |
| from: ····· to: ····· | HOME-STAY C4 | TRAIN | — | HOLIDAY | PERSON WHO GOES OUT WITH TRAIN ON HOLIDAY | HOLIDAY-TRIP PERSON |

| APP ACTIVATION HISTORY 146a | BEHAVIOR 146b | FEATURE BEHAVIOR INFORMATION 146c | TEMPORAL INFORMATION (SEASON/TIME) 146d | PROFILE 146e | PROFILE CATEGORY 146f |
| --- | --- | --- | --- | --- | --- |
| MUSIC REPRODUCTION | RUNNING | — | — | JOGGING | ACTIVE SPORTS |
| MUSIC REPRODUCTION | JUMP, TURN | — | — | DANCE | ACTIVE SPORTS |
| ELECTRONIC BOOK | TRAIN | — | MORNING | READING IN COMMUTATION | READING PERSON |
| PHOTO APP | WALKING | — | HOLIDAY | SNAP PHOTO | PHOTO PERSON |

FIG. 19

User.A

| LATITUDE AND LONGITUDE | PLACE NAME | PLACE CATEGORY | BEHAVIOR | PROFILE | PROFILE CATEGORY |
|---|---|---|---|---|---|
| ......, ...... | ABC SKI RESORT | SKI RESORT (SLOPE OF MOUNTAIN) | JUMP, TURN | SNOW SPORTS | ACTIVE SPORTS |
| ......, ...... | KUGENUMA KAIGAN | BEACH | TURN | SURFING | ACTIVE SPORTS |

User.B

| LATITUDE AND LONGITUDE | PLACE NAME | PLACE CATEGORY | BEHAVIOR | PROFILE | PROFILE CATEGORY |
|---|---|---|---|---|---|
| ......, ...... | ABC SKI RESORT | SKI RESORT (SLOPE OF MOUNTAIN) | WALKING | TREKKING, MOUNTAIN CLIMBING | ACTIVE SPORTS |
| ......, ...... | KUJUKURIHAMA | BEACH | TURN | SURFING | ACTIVE SPORTS |

User.C

| LATITUDE AND LONGITUDE | PLACE NAME | PLACE CATEGORY | BEHAVIOR | PROFILE | PROFILE CATEGORY |
|---|---|---|---|---|---|
| ......, ...... | KUGENUMA KAIGAN | BEACH | SITTING | FISHING | OUTDOOR |

FIG. 28

| SITUATION | DETAILS | PURPOSE | STATE |
|---|---|---|---|
| FRONT CHAMBER IN WHICH PEOPLE WAIT FOR WEDDING RECEPTION | • FACILITATOR IS ABSENT<br>• ONE-TO-ONE | TO KILL TIME | A |
| KILLING TIME UNTIL PARTY AFTER WEDDING RECEPTION | • FACILITATOR IS ABSENT | TO KILL TIME | C |
| IN TRAIN ON WAY HOME FROM WELCOME PARTY | • FACILITATOR IS ABSENT<br>• ONE-TO-ONE | TO AVOID SILENCE | C |
| MATCHMAKING PARTY | • FACILITATOR IS PRESENT<br>• n-TO-n | PEOPLE WHO FIRST MEET EACH OTHER ARE MOTIVATED TO BE INTIMATE | B |

FIG. 29

| | TOPIC CONTINUED | TOPIC ADDED OR SWITCHED | DIRECTION OF TOPICS |
|---|---|---|---|
| STATE A | ○ | ◎ (TOPIC SWITCHED) | PHASE FOR SEARCHING FOR TOPIC WHICH ATTRACTS INTEREST. IN CASE IN WHICH DEGREE OF INTEREST OF PARTNER IS LOW, SWITCH TO NEW TOPIC IS REQUESTED. |
| STATE B | ○ | — (NATURALLY ADDED) | TOPIC IS SUPPLIED FROM COMMON EVENT. TOPIC IS CONTINUED BY PRESENTING RELEVANT INFORMATION. |
| STATE C | ◎ (RELEVANT INFORMATION PRESENTATION) | △ | EVENTS ARE LOOKED BACK IN COMMON EVENT. THERE HAVE ALREADY BEEN MANY TOPICS. TOPICS ARE DEVELOPED BY PRESENTING RELEVANT INFORMATION. |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/056481 (filed on Mar. 2, 2016) under 35 U.S.C. § 371, which claims priority to Japanese Patent Application No. 2015-118930 (filed on Jun. 12, 2015), which are all hereby incorporated by reference in their entirety.

TECHNICAL FIELD

The present disclosure relates to an information processing device, an information processing method, and a program.

BACKGROUND ART

In a case in which conversations start with new partners during parties or conversations with friends and acquaintances, it is sometimes difficult to introduce topics. This is because there is no means or clues for selecting appropriate topics with conversation partners.

As a technology for providing pleasant and natural conversations to users, for example, Patent Literature 1 discloses a conversation processing device that filters information serving as topics supplied from a database in accordance with data regarding a preference of a user and causing remaining information to be used for conversations with the user.

CITATION LIST

Patent Literature

Patent Literature 1: JP 2001-188787A

DISCLOSURE OF INVENTION

Technical Problem

However, even when a topic is presented according to a preference of an interest of a conversation partner as in Patent Literature 1, it is difficult to continue a conversation when a person presenting the topic is not interested in or familiar with the topic.

Accordingly, the present disclosure proposes a novel and improved information processing device, a novel and improved information processing method, and a novel and improved program capable of appropriately presenting a topic in consideration of a behavior of a user presenting the topic.

Solution to Problem

According to the present disclosure, there is provided an information processing device including: a topic generation unit configured to generate topics with a conversation partner on the basis of a comparison result between a certain behavior of a user and comparison information regarding the behavior; and a topic suggestion unit configured to decide a topic candidate to be suggested to the user from the generated topics.

Further, according to the present disclosure, there is provided an information processing method comprising: by a processor, generating topics with a conversation partner on the basis of a comparison result between a certain behavior of a user and comparison information regarding the behavior; and deciding a topic candidate to be suggested to the user from the generated topics.

Moreover, according to the present disclosure, there is provided a program causing a computer to function as an information processing device including a topic generation unit configured to generate topics with a conversation partner on the basis of a comparison result between a certain behavior of a user and comparison information regarding the behavior, and a topic suggestion unit configured to decide a topic candidate to be suggested to the user from the generated topics.

Advantageous Effects of Invention

According to the present disclosure, as described above, it is possible to appropriately present a topic in consideration of a behavior of a user presenting the topic. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram illustrating an example in which a behavior with topicality is extracted from a change in a behavior tendency of the user.

FIG. 7 is an explanatory diagram illustrating an example in which a behavior tendency different from previous and recent behavior tendencies in a certain section is extracted in a previous behavior tendency of the user.

FIG. 9 is an explanatory diagram illustrating an example in which a behavior with topicality is extracted from deviation in information regarding a behavior common to the users.

FIG. 10 is an explanatory diagram illustrating another example in which a behavior with topicality is extracted from deviation in information regarding a behavior common to the users.

FIG. 14 is an explanatory diagram illustrating an example of a user behavior information table acquired in the process of generating the profile in FIG. 13.

FIG. 15 is an explanatory diagram illustrating an example of a profile of a user A generated from stay positions and behavior recognition results.

FIG. 16 is an explanatory diagram illustrating an example of a profile of a user B generated from stay positions and behavior recognition results.

FIG. 17 is an explanatory diagram illustrating an example of a profile of a user C generated from stay positions and behavior recognition results.

FIG. 18 is an explanatory diagram illustrating an example of a profile generated from an app activation history and behavior recognition results.

FIG. 19 is an explanatory diagram illustrating a process of deciding a topic to be presented by matching of the profile.

FIG. 28 is an explanatory diagram illustrating examples of specific situations.

FIG. 29 is an explanatory diagram illustrating an example of directions of topics corresponding to situations.

MODE(S) FOR CARRYING OUT THE INVENTION

Figure 1:
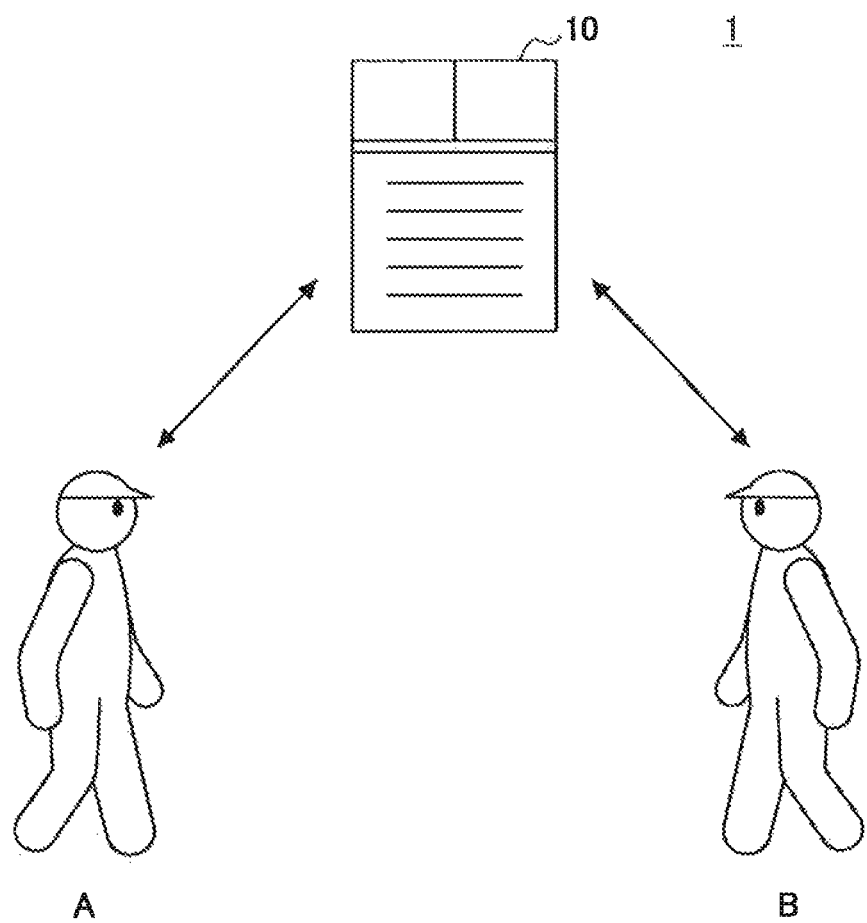
FIG. 1 is an explanatory diagram illustrating an overview of a topic supply system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description will be made in the following order.
1. Overview
2. Functional configuration
3. Topic supply method
3.1. Topic generation process
3.2. Topic suggestion process
3.3. Topic presentation process
4. Conclusion
5. Hardware configuration
6. Supplement <1. Overview>

First, an overview of a topic supply system 1 according to an embodiment of the present disclosure will be described with reference to FIG. 1. FIG. 1 is an explanatory diagram illustrating an overview of the topic supply system 1 according to the embodiment.

The topic supply system 1 according to the embodiment is a system that supplies topics to users who converse via a server 10, as illustrated in FIG. 1. The server 10 can acquire information regarding a behavior of each user and generates and supplies appropriate topics on the basis of the information regarding the behavior of each user. Accordingly, for example, in a case in which users A and B illustrated in FIG. 1 are unacquainted such as when meeting for the first time or participating in the same event on that day, the server 10 can supply an appropriate topic to the users on the basis of behaviors of the users A and B.

Also, the server 10 is assumed to be able to acquire information regarding behaviors of users from another server or various kinds of terminals carried by the users. Examples of the information regarding the behaviors of the users include sensor information such as temporal information and positional information acquired using various sensing technologies and action behavior information regarding users recognized by analyzing the sensor information.

The server 10 that functions as an information processing device supplying topics in the topic supply system 1 according to the embodiment generates topics for a conversation partner on the basis of a comparison result between a certain behavior of a user and comparison information regarding the behavior. Then, the server 10 extracts an appropriate topic from the generated topics and decides topic candidates to be suggested to the user. Hereinafter, the configuration and function of the topic supply system 1 according to the embodiment will be described in detail.

<2. Functional Configuration>

Figure 2:
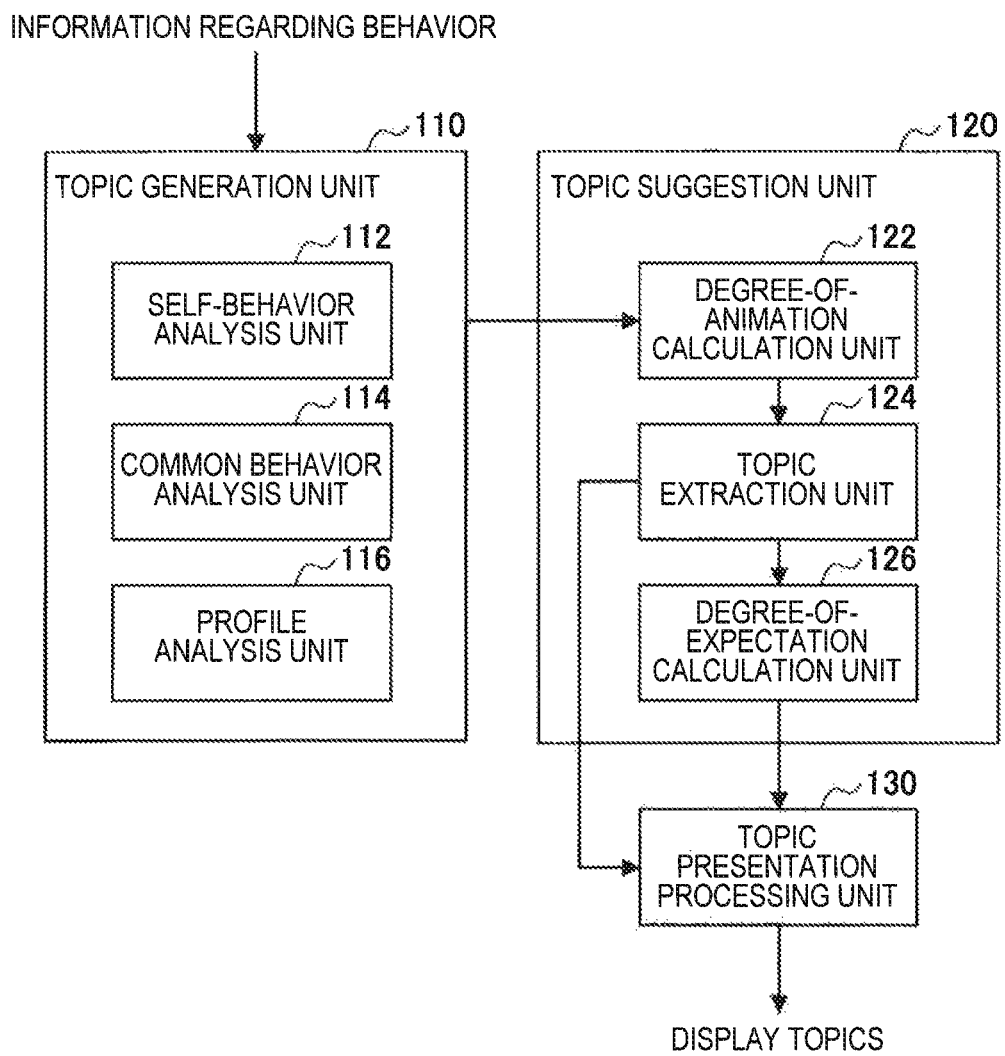
FIG. 2 is a functional block diagram illustrating a functional configuration of an information processing device according to the embodiment.

First, a functional configuration of an information processing device 100 that performs a process of supplying topics in the topic supply system 1 according to the embodiment will be described with reference to FIG. 2. FIG. 2 is a functional block diagram illustrating the functional configuration of the information processing device 100 according to the embodiment.

In the embodiment, the information processing device 100 is included in the server 10. As illustrated in FIG. 2, the information processing device 100 includes a topic generation unit 110, a topic suggestion unit 120, and a topic presentation processing unit 130.

(Topic Generation Unit)

The topic generation unit 110 generates topics with a conversation partner on the basis of information regarding behaviors of a user who converses. The topic generation unit 110 acquires the information regarding the behaviors of the user who converses, extracts information serving as topics from a deviation from another person, a change in a behavior of which the user is unaware, or the like, and set the information as topic candidates. The topic generation unit 110 includes, for example, a self-behavior analysis unit 112, a common behavior analysis unit 114, and a profile analysis unit 116, as illustrated in FIG. 2.

The self-behavior analysis unit 112 analyzes the behavior of the user who suggests a topic, extracts a specific behavior tendency, a change in the behavior, or the like of the user, and sets the specific behavior tendency, the change in the behavior, or the like as a topic. For example, the self-behavior analysis unit 112 extracts a profile indicating a hobby, a tendency, a taste, or the like from a previous behavior log of only the user or extracts a deviation between the previous behavior log and a recent behavior log of only the user.

The common behavior analysis unit 114 analyzes common behaviors which have been executed by both users who converse, extracts common points, deviation, or the like of behaviors of the users, and sets the common points, deviation, or the like as topics. For example, the common behavior analysis unit 114 compares overlaps of profiles of the users or extracts a deviated behavior of a user who suggests a topic from behaviors frequently executed by a conversation partner.

The profile analysis unit 116 generates the profiles of the users and generates a topic by matching the generated profiles. For example, the profile analysis unit 116 analyzes stay positions of a user and transitions between the stay positions from chronological positional information acquired as the sensor information and generates a profile indicating a hobby, a tendency, a taste, or the like of the user. At this time, a behavior recognition result of the user recognized through a separate behavior recognition technology may be considered. The profile analysis unit 116 generates a common topic by matching profiles of the users who converse using the generated profiles.

The topic generation unit 110 may generate topics by operating at least one of the self-behavior analysis unit 112, the common behavior analysis unit 114, and the profile analysis unit 116. The topic generation unit 110 outputs the generated topics to the topic suggestion unit 120.

(Topic Suggestion Unit)

The topic suggestion unit 120 extracts topics appropriate for a circumstance in which conversation is executed from the generated topics and performs a process of suggesting the topic as topic candidates to the user. As illustrated in FIG. 2, the topic suggestion unit 120 includes, for example, a degree-of-animation calculation unit 122, a topic extraction unit 124, and a degree-of-expectation calculation unit 126.

The degree-of-animation calculation unit 122 calculates the degree of animation of the communication circumstance formed between a user and a conversation partner. For example, the degree-of-animation calculation unit 122 may calculate the degree of animation on the basis of an evaluation function regarding a response of the conversation partner to speech of the user. The degree-of-animation calculation unit 122 outputs the calculated degree of animation to the topic extraction unit 124.

The topic extraction unit 124 extracts topics corresponding to the degree of animation from the topics generated by the topic generation unit 110. For example, when a communication circumstance is animated in an introduced topic, the topic extraction unit 124 adds relevant information relevant to the currently introduced topic to topic candidates. Conversely, when the circumstance of the communication is not animated in the introduced topic, the topic extraction unit 124 adds a different new topic from the currently introduced topic to the topic candidates. In addition, the topic extraction unit 124 may weight each topic generated by the topic generation unit 110 on the basis of state information decided in accordance with a situation in which the user and the conversation partner converse and may extract a more appropriate topic as a topic candidate.

The topic extracted by the topic extraction unit 124 is output to the topic presentation processing unit 130 as a topic candidate to be suggested to the user. In addition, the extracted topic is output to the degree-of-expectation calculation unit 126 as necessary.

The degree-of-expectation calculation unit 126 calculates the degree of expectation of the communication circumstance becoming animated when a topic is introduced in regard to each topic extracted as a topic candidate. The degree of expectation is a predicted effect value indicating predicted random-variable animation of a circumstance when a topic is introduced. The degree-of-expectation calculation unit 126 calculates the degree of expectation in regard to each topic and outputs the degree of expectation to the topic presentation processing unit 130.

(Topic Presentation Processing Unit)

The topic presentation processing unit 130 performs a process of presenting topic candidates extracted by the topic suggestion unit 120 to a user. The topic presentation processing unit 130 may change a topic presentation method in accordance with a situation in which the user and a conversation partner converse. For example, in a case in which a topic is supplied without being noticed in the surroundings, the topic may be presented naturally to only the user to whom the topic is supplied. Alternatively, in a case in which presentation of a topic is set as an entertainment element for animating a circumstance, the topic may be presented to users participating in the conversation. The topic presentation processing unit 130 performs a predetermined process so that topic candidates are presented to users with devices presenting the topic candidates to the user and outputs the topic candidates to each device.

The functional configuration of the information processing device 100 according to the embodiment has been described above.

<3. Topic Supply Method>

Figure 3:
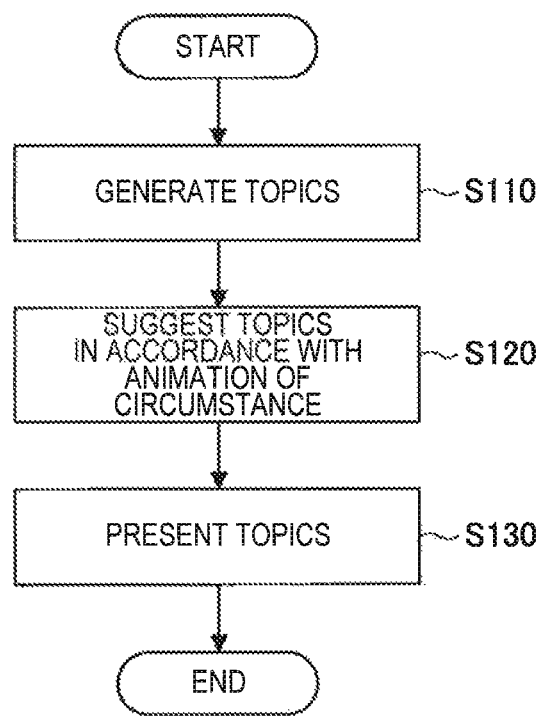
FIG. 3 is a flowchart illustrating a topic supply method in which the topic supply system according to the embodiment is used.

Hereinafter, a topic supply method in which the topic supply system 1 according to the embodiment is used will be described with reference to FIG. 3. FIG. 3 is a flowchart illustrating the topic supply method in which the topic supply system 1 according to the embodiment is used.

[3.1. Topic Generation Process]

As illustrated in FIG. 3, in the topic supply system 1 according to the embodiment, the topic generation unit 110 first performs a process of generating topics to be presented to a user (S110). In the topic supply system 1 according to the embodiment, the topics with a conversation partner are generated on the basis of information regarding behaviors of a user who converses. The topic generation unit 110 acquires information regarding behaviors of the user who converses, extracts information serving as the topics from a deviation from another person, a change in a behavior of which the user is unaware, or the like and set the information as topic candidates.

As methods of generating the topics using the information regarding behaviors of the user, for example, there are the following methods of:

(1) generating topics from information regarding behaviors of the user;

(2) generating topics from behaviors in regard to common behaviors between the users; and (3) generating topics by matching profiles of the users.

Hereinafter, the methods will be described in detail.

(1) Generating Topics from Information Regarding Behaviors of User

Figure 4:
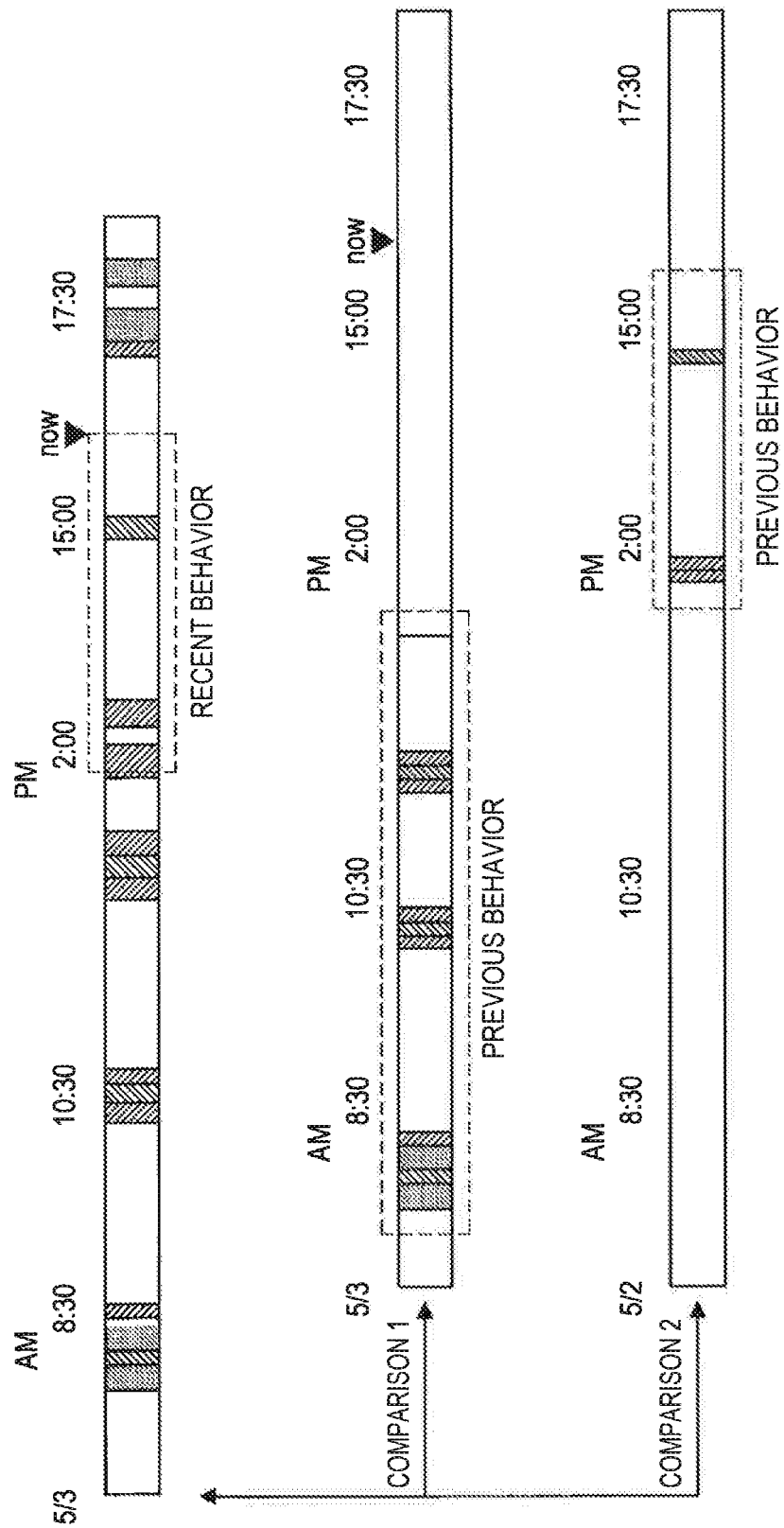
FIG. 4 is an explanatory diagram illustrating comparison of behavior logs of a user.
Figure 5:
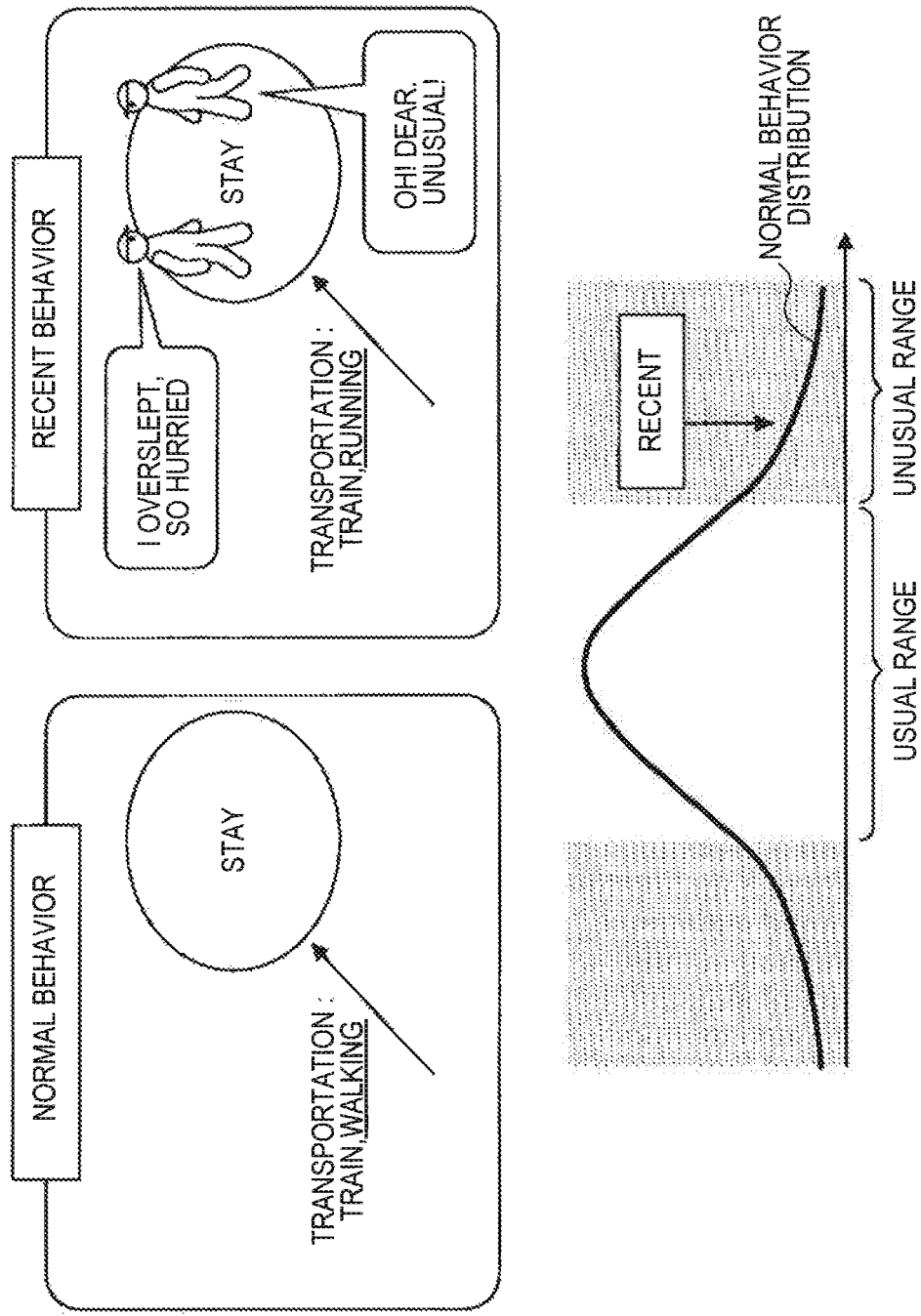
FIG. 5 is an explanatory diagram illustrating an example in which a behavior with topicality is extracted from deviation between a previous behavior tendency and a recent behavior of the user.

First, a method of generating topics using only information regarding behaviors of a user to whom topics are supplied will be described with reference to FIGS. 4 to 7. FIG. 4 is an explanatory diagram illustrating comparison of behavior logs of a user. FIG. 5 is an explanatory diagram illustrating an example in which a behavior with topicality is extracted from deviation between a previous behavior tendency and a recent behavior of the user. FIG. 6 is an explanatory diagram illustrating an example in which a behavior with topicality is extracted from a change in a behavior tendency of the user. FIG. 7 is an explanatory diagram illustrating an example in which a behavior tendency different from previous and recent behavior tendencies in a certain section is extracted in a previous behavior tendency of the user.

The generation of the topics through the self-behavior analysis is performed using only information regarding a behavior of a user to whom topics are supplied by the self-behavior analysis unit 112. For example, a behavior log in which action behaviors of the user recognized by analyzing the sensor information are represented chronologically is used as the information regarding the behavior of the user. For example, a behavior log indicating behavior content of the user on one day is considered, as illustrated in the upper side of FIG. 4. Self-behaviors of the user are analyzed by comparing data in a partial section in the behavior log to data in another section.

For example, a behavior in a section traced back a predetermined time from a current time point illustrated on the upper side of FIG. 4 is assumed to be a recent behavior. At this time, for example, as illustrated in the middle of FIG. 4, a behavior in a previous section of the section of the recent behavior on the same day may be compared to the recent behavior and a tendency or a change in the behavior of the user may be determined (comparison 1). Alternatively, for example, as illustrated in the lower side of FIG. 4, a behavior in the same section on the previous day may be compared to the recent behavior and the tendency or the change in the behavior of the user may be determined (comparison 2).

Then, the self-behavior analysis unit 112 abstracts a result obtained by comparing a behavior in different sections of the behavior log in order to extract a tendency or a change of a behavior which is likely to be a topic. As behavior features obtained by abstracting a behavior comparison result, for example, the following features are considered:

frequency: e.g., walking frequently for quite a while;
continuity: e.g., walking continuously for quite a while;
interval: e.g., walking again some time after having walked for quite a while;
difference: e.g., a current time at which a user gets on a train is later than a previous time;

total: e.g., walking more often in a current period of time than another period of time;
protrusion: e.g., various behaviors are executed in a current period of time compared to a recent time;
similarity: e.g., a pattern of a current period of time is the same as a previous pattern;
change: e.g., running often recently; and
period: e.g., running every spring.

Of the foregoing feature behaviors, behaviors which are likely to be topics are "protrusion," "change," and "difference." That is, in a case in which there is a difference between a recent behavior and a previous behavior of the user, it is easy for the difference to become content of the conversation.

Protrusion

Specifically, deviation in a recent behavior from a previous behavior tendency of the user can first be extracted from the behavior feature "protrusion." For example, as illustrated on the upper side of FIG. 5, in a behavior in which a user arrives at a certain stay position, the user normally gets on a train and walks to arrive at the stay position in many cases. However, in a recent behavior, it is assumed to be detected that the user gets on a train and runs to arrive at the stay position. When a probability distribution of the frequency or number of times of behaviors at the normal time for a predetermined period of time or at a predetermined position is generated, for example, a normal distribution illustrated on the lower side of FIG. 5 is obtained. Behaviors within a predetermined range in the middle of this distribution are frequently executed and can be said to be behaviors in a usual range which are not topics. Conversely, behaviors outside of the normal range can be said to behaviors in an unusual range different from the normal time.

In this way, in a case in which a recent behavior is an unusual behavior compared to a usual behavior of the user in regard to a certain behavior, it is predicted that a behavior with certain topicality is likely to occur. In the example illustrated in FIG. 5, delay of a train, oversleeping, or the like occurs, and thus is predicted that the recent behavior is different from a behavior of the normal time, Change Next, a tendency of a change in a recent behavior from a previous behavior tendency of the user can be extracted from the behavior feature "change." For example, when the user gradually runs for a long time in a behavior, jogging, it can be understood that a distribution gradually moves to the right side, as illustrated on the lower side of FIG. 6, referring to a distribution of a running time per day of the user for each predetermined period (for example, units of 3 months).

When the distribution during each period illustrated in FIG. 6 is compared to a distribution in a lifetime of the user which is comparison information, an average value of each distribution is within a standard range of the distribution in the lifetime and a value does not deviate from the comparison information. However, it is easy for a tendency of a change in the behavior to become a topic. For example, in a case in which there is a tendency of the change in the behavior, an increase in a jogging time, this tendency may be set as a topic when a topic regarding running is raised.

Difference (Previous Protrusion)

In addition, a behavior tendency of the user in a previous certain section different from another previous section and a recent behavior tendency can be extracted from the behavior feature, "difference." This behavior tendency can also be said to be a behavior feature "protrusion" in the past. For example, as illustrated in FIG. 7, a case in which a behavior tendency in the lifetime of a jogging behavior of the user is hardly different from that of the recent behavior but there is a behavior tendency exceeding a standard range of the distribution in the lifetime for a certain past period (for example, high school) corresponds to the behavior feature. In this example, the behavior tendency in the lifetime is comparison information. In this way, a behavior different from other behaviors and protruding partially from the entirety may be extracted and set as a topic.

Also, the comparison information may be information other than the behavior tendency in the lifetime and a behavior tendency recognized from a behavior of the user for a period sufficiently longer than a section of a behavior tendency compared to the comparison information may be used. In addition, previous sections compared to the comparison information may not necessarily have the same time length. For example, when the previous sections are partitioned in accordance with a life stage, the previous sections are easily supplied as topics. For example, sections such as childhood, elementary school, junior high school, high school, college, and adulthood or sections partitioned by events such as job transfer and marriage may be set.

As described above, in a case in which data in a partial section in the behavior log of the user is compared to data in another section and a recent behavior of the user is different from a previous behavior, the self-behavior analysis unit 112 extracts the difference as content which easily serves as a topic.

(2) Generating Topics Through Common Behavior Analysis

Figure 8:
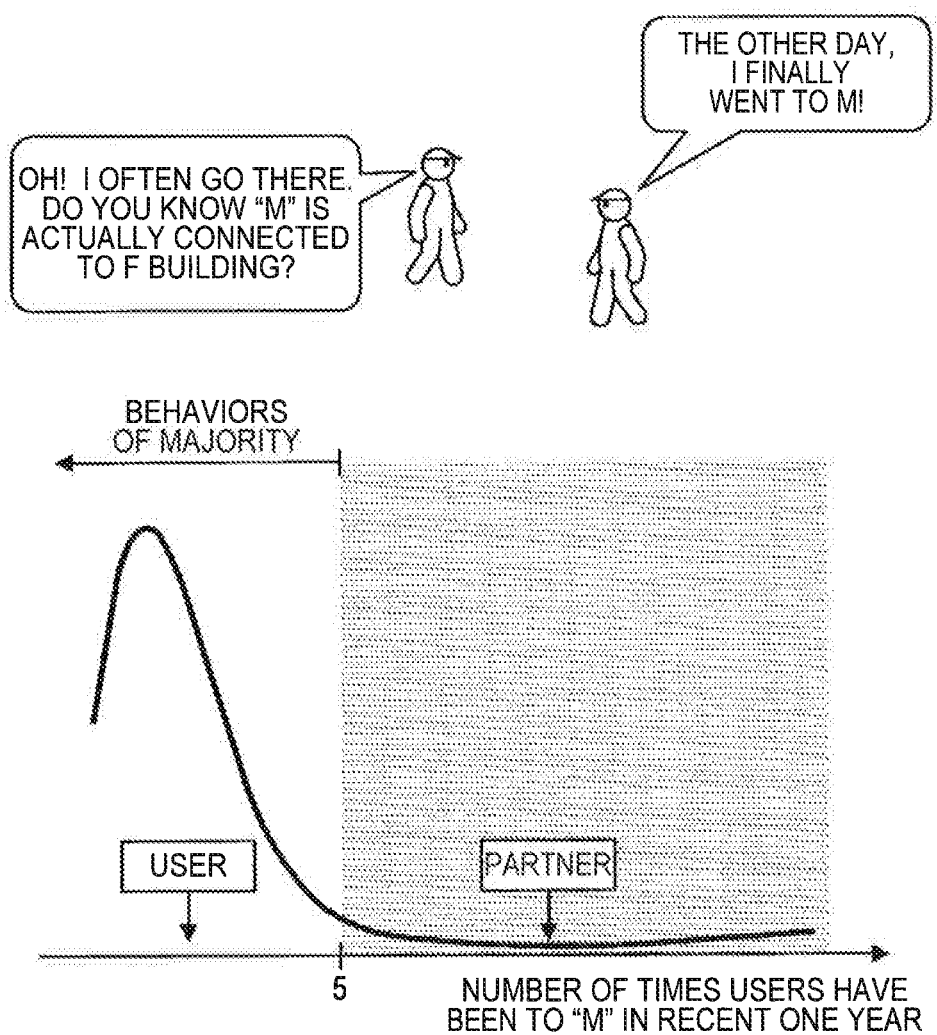
FIG. 8 is an explanatory diagram illustrating an example in which a behavior with topicality is extracted from a difference in a frequency of a behavior common to users.
Figure 11:
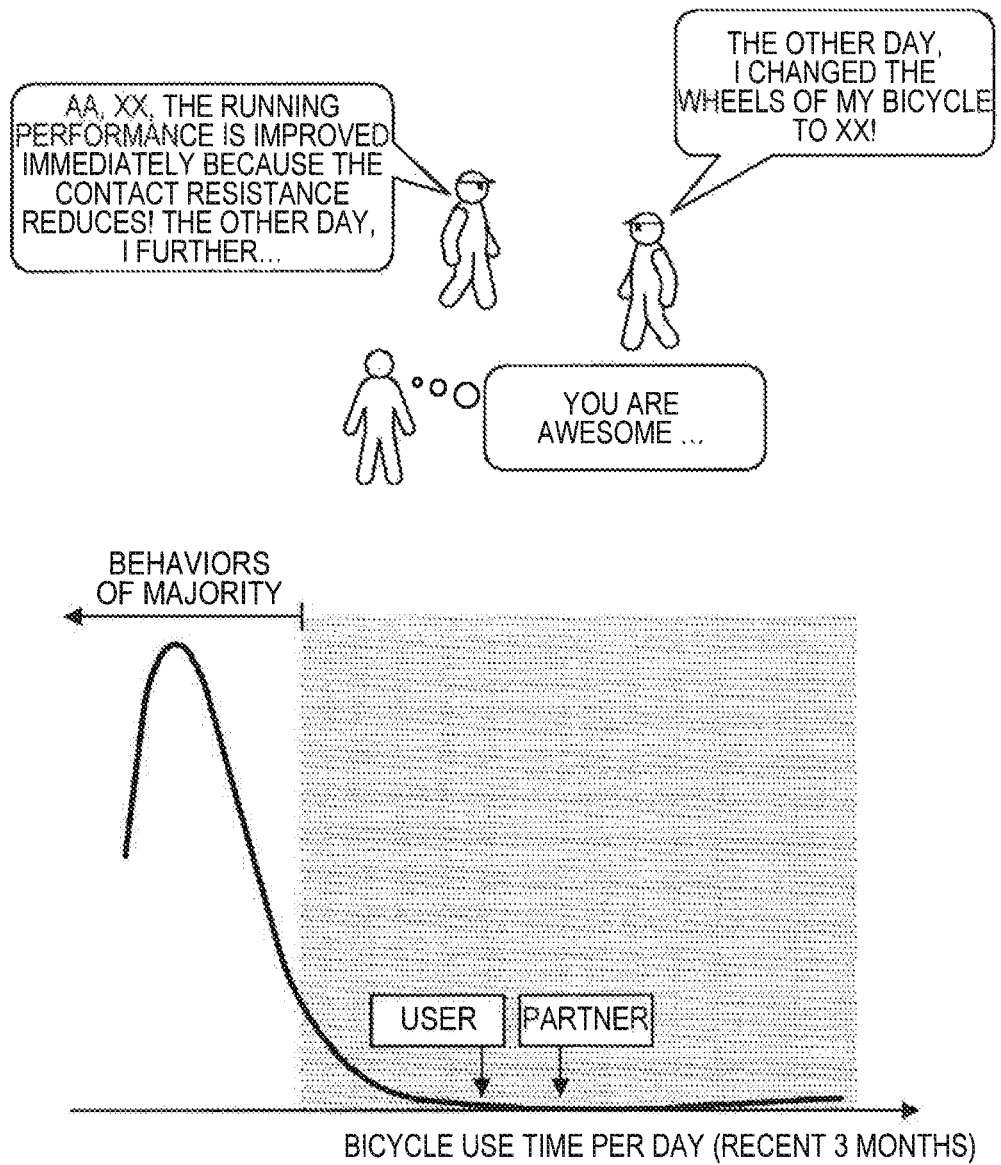
FIG. 11 is an explanatory diagram illustrating an example in which a topic is extracted from deviation of the behavior tendency of the behavior common to the users from public.

Next, the method of generating topics using the information regarding behaviors common to the users will be described with reference to FIGS. 8 to 11. FIG. 8 is an explanatory diagram illustrating an example in which a behavior with topicality is extracted from a difference in a frequency of a behavior common to users. FIG. 9 is an explanatory diagram illustrating an example in which a behavior with topicality is extracted from deviation in information regarding a behavior common to the users. FIG. 10 is an explanatory diagram illustrating another example in which a behavior with topicality is extracted from deviation in information regarding a behavior common to the users. FIG. 11 is an explanatory diagram illustrating an example in which a topic is extracted from deviation of the behavior tendency of the behavior common to the users from the public.

In the above-described method of generating topics from the information regarding the behavior of the user, for example, a topic which can be easily used as a response to a topic supplied by a conversation partner can be generated. On the other hand, in the generation of topics through the self-behavior analysis, information regarding a behavior of the conversation partner is not considered. Therefore, in a case in which the conversation partner has also executed or is interests in a behavior executed in a topic, the topic is developed. Otherwise, the topic moves on. Accordingly, by searching for a common behavior executed between the user and the conversation partner, it is possible to generate a topic that further interests the partner. The generation of topics through the common behavior analysis is performed by the common behavior analysis unit 114.

Difference in Frequency of Common Behavior

As a specific method of generating topics through the common behavior analysis, for example, there is a method of extracting a behavior with topicality from a difference in the frequency of a common behavior between users. For example, in a case in which both users who converse went to a complex facility M, a difference in the frequency at which the users went to the complex facility M can be set as a topic. For example, as illustrated on the lower side of FIG. 8, in a group that meets in accordance with generation, affiliation, or the like, the number of times the users have been to the complex facility M over the past year is assumed to be equal to or less than 5 for the majority. Here, in a case in which a user supplying a topic went to the complex facility M for the first time recently, the user is included in the majority. However, in a case in which a conversation partner goes to the complex facility M twice or three times per month, the conversation partner is included in the minority. In this way, in a case in which there is a difference between the frequencies at which the user and the conversation partner go to the complex facility M, the difference between the frequencies may be set as a topic.

Here, a frequency of a behavior of a user is associated with proficiency of the user in the behavior or the strength of an interest and concern. From this viewpoint, a behavior in which a conversation partner goes at a higher frequency than the user supplying a topic may be generated as a topic. That is, the common behavior analysis unit 114 generates topics so that a topic in a field in which the conversation partner is proficient is adopted. When a behavior in which the user supplying a topic executes the behavior at a higher frequency than the conversation partner is adopted, the user seems to boast of knowledge to the conversation partner. Therefore, such a behavior may be refrained from be raised as a topic animating a circumstance.

In a case in which a topic is generated from the difference in a frequency of a behavior, it is important for both of the user and the conversation partner who converse to take the behavior. When the user presenting a topic is not interested in content of a topic and has not executed the content despite the content of the topic which is a field in which the conversation partner is proficient, it is difficult to animate subsequent conversation, and thus the topic is not appropriate as a topic supplied to the user by the topic supply system 1.

Difference Subordinate Information Regarding Common Behavior

As another method of generating topics through the common behavior analysis, topics can also be generated using a difference in subordinate information regarding a common behavior between the users who converse. For example, as illustrated on the lower side of FIG. 9, when behaviors in which the users go to the complex facility M for a certain period of time are considered in a group collected in accordance with generation, affiliation, or the like, it can be understood that many people do to shopping. Like the majority of people, the conversation partner also does shopping in the complex facility M. Here, the user supplying a topic normally goes to the complex facility M to shopping. However, in a case in which the user goes to the complex facility M to receive training, a difference between a normal purpose and a purpose for going to the complex facility M may be set as a topic.

Even in this case, it is important for both the user and the conversation partner who converse to take the behavior. For example, when the conversation partner has not been to the complex facility M, the conversation partner knows that the complex facility M is a training facility although the fact that the user goes to the complex facility M to receive the training rather than shopping is set as a topic. In this way, by extracting a difference in the behavior tendency from the common behavior to the users who converse, content in which the users are mutually interested can be set as a topic.

In addition, for example, a difference in transportation to a certain stay position can also be used to generate a topic in addition to the difference in the purpose for a behavior. For example, when both the user and the conversation partner have gone sightseeing in Hokkaido, unexpectedness of the transportation may be set as a topic in a case in the transportation to Hokkaido is different. At this time, as illustrated on the lower side of FIG. 10, from a distribution of the transportation to Hokkaido in a certain group, half or more of people move to Hokkaido using airplanes. The conversation partner also moves to Hokkaido using an airplane. On the other hand, in a case in which the user supplying a topic moved to Hokkaido using a ferry, a difference in the transportation may be set as a topic.

Even in this case, it is important for the user and the conversation partner who converse to have the same experience in a large outline. For example, in a case in which the conversation partner has not been to Hokkaido, two new pieces of information, "Hokkaido" and "Ferry," are simultaneously given to the conversation partner even when a topic "been to Hokkaido with ferry" is supplied, and thus there is a possibility of the information being not suitable as a conversation opportunity. In this case, a topic "been to Hokkaido with ferry" is suggested to the conversation partner and only in a case in which the conversation partner is interested in the topic, the information may be presented step by step so that the conversation is developed to conversation "moved with ferry."

Deviation from Public

As still another method of generating topics through the common behavior analysis, for example, there is a method of extracting deviation of common behaviors to the users from the public. That is, both the users who converse have a behavior tendency deviated from the public in some cases. For example, in a case in which both the users who converse go by race bicycles, a bicycle use time is considerably different from the bicycle use time of general people who use bicycles for daily moving. For example, as illustrated on the lower side of FIG. 11, the bicycle use time of the majority is equal to or less than a certain time in a distribution of the bicycle use time per day in a group collected in accordance with generation, affiliation, or the like. At this time, the bicycle use time of the users who converse is considerably greater than the time of the majority of people. On the minority side, a difference of the behavior tendency from the public may be set as a topic.

In this case, in regard to the common behavior common to the user and the conversation partner who converse, a topic is a proficiency field and content in which interest or concern is strong. Accordingly, a topic presented to the user supplying a topic may not be a searching and groping topic to see how the partner is, but may be a topic which abruptly becomes a core. In this way, in a case in which a behavior common to the users is deviated from the public, a kind of fellowship between the user and the conversation partner can be provoked and the conversation can be animated by presenting a core deep topic of the behavior to the user supplying the topic.

(3) Generating Topics by Matching Profiles

Next, the method of generating topics on the basis of profiles of the users who converse will be described. In the generation of the profiles according to the embodiment, chronological positional information and a behavior recognition result are used.

Figure 12:
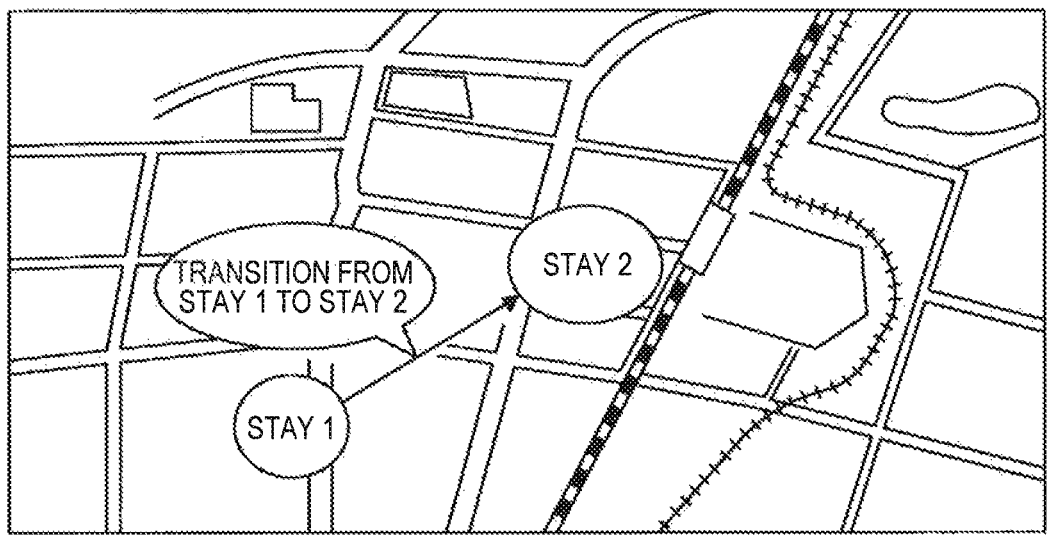
FIG. 12 is an explanatory diagram illustrating "stay positions" and "transition between the stay positions" obtained as a behavior recognition result of the user.

FIG. 12 is an explanatory diagram illustrating "stay positions" and "transition between the stay positions" obtained as a behavior recognition result of the user. From the chronological positional information, "stay positions" such as "stay 1" and "stay 2" illustrated in FIG. 12 can be distinguished from "transition between the stay positions" such as "transition from stay 1 to stay 2." A profile indicating a hobby, a tendency, a taste, or the like of the user can be generated using information regarding the positions. For example, from the "stay positions" and the behavior recognition result, a purpose why the person comes to the position and a hobby or a taste can be known in detail. In addition, for example, a behavior tendency of the person can also be known from a history of transportation in the "transition between the stay positions."

The profile analysis unit 116 generates the profile indicating the hobby, the tendency, the taste, or the like of the user, matches the profiles of each user who converse using the generated profile, and generates a common topic.

a) Profile Generation Process

Figure 13:
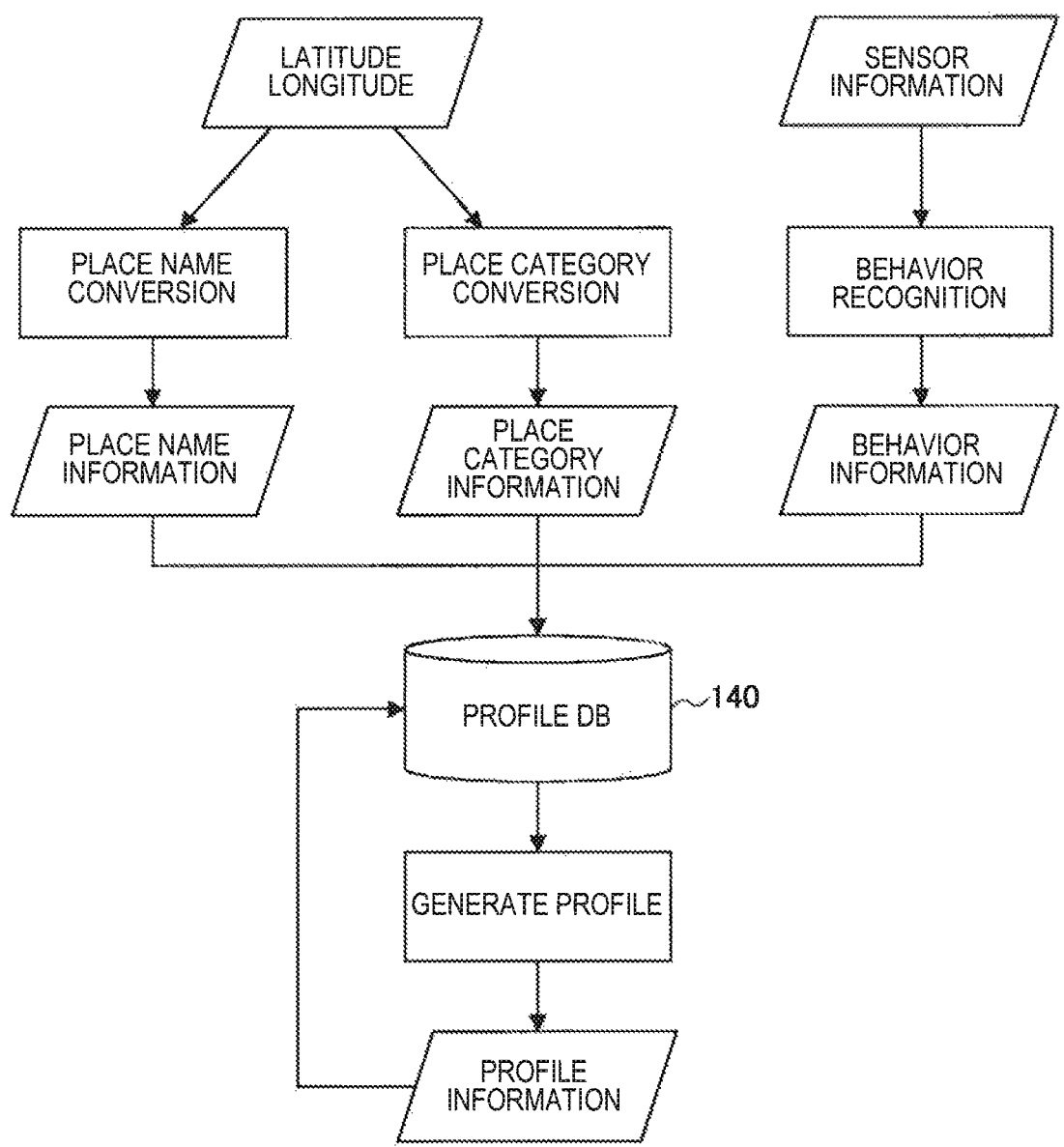
FIG. 13 is an explanatory diagram illustrating a process of generating a profile indicating purposes at stay positions of the user from the stay positions and behavior recognition results.

First, a profile generation process will be described in detail with reference to FIGS. 13 to 18. Also, FIG. 13 is an explanatory diagram illustrating a process of generating a profile indicating purposes at stay positions of the user from the stay positions and behavior recognition results. FIG. 14 is an explanatory diagram illustrating an example of a user behavior information table 142 acquired in the profile generation process in FIG. 13. FIGS. 15 to 17 are explanatory diagrams illustrating examples of profiles of users generated from stay positions and behavior recognition results. FIG. 18 is an explanatory diagram illustrating an example of a profile generated from an app activation history and behavior recognition results.

Generating Profile on Basis of in Stay Positions and Behavior Recognition Result A profile can be generated, for example, on the basis of stay positions and a behavior recognition result. In the profile generation process based on stay positions and a behavior recognition result, as illustrated in FIG. 13, latitude and longitude which are positional information of the user are first converted into place name information and a place category. A place name is a name such as the name of a place or the name of a facility. The place category is information indicating a genre of a place.

The profile analysis unit 116 performs a place name conversion process and a place category conversion process based on latitude and longitude with reference to a place DB (not illustrated) that retains a correspondence relation between the latitude and longitude, and the place name and the place category. The place DB may be installed in the server 10 including the information processing device 100 or may be installed in an external server connected to be able to communicate with the information processing device 100. The profile analysis unit 116 records the acquired place name and place category as user behavior information on the profile DB 140.

In addition, the profile analysis unit 116 acquires a behavior recognition result obtained by performing a behavior recognition process using sensor information as a behavior of the user. Thus, for example, the behavior recognition process in which a behavior of the user such as walking or running is acquired is performed using a technology for recognizing an action behavior of the user from sensor information acquiring using any of various sensing technologies. The behavior recognition process may be performed in the server 10 including the information processing device 100 or may be performed in an external server connected to be able to communicate with the information processing device 100. The profile analysis unit 116 records an acquired behavior recognition result as a behavior of the user on the profile DB 140.

When the place name, the place category, and the behavior information of the user are acquired, the profile analysis unit 116 generates a profile on the basis of the information. The profile analysis unit 116 acquires a purpose of the user in that place as a profile in accordance with a motion of the user in that place. In addition, the profile category to which the profile belongs is specified on the basis of a relation between a preset profile and the profile category.

Here, FIG. 14 illustrates an example of a user behavior information table 142 recorded on the profile DB 140. As illustrated in FIG. 14, the user behavior information table 142 includes, for example, latitude and longitude 142a, a place name 142b, a place category 142c, behavior information 142d, a profile 142e, and a profile category 142f. On the basis of the place name 142b, the place category 142c, and the behavior information 142d, results analyzed by the profile analysis unit 116 are recorded as the profile 142e and the profile category 142f. For example, from information indicating that a behavior "jump or turn" is executed in an "ABC ski resort," the profile analysis unit 116 analyzes that "snow sports" is executed. The "snow sports" belongs to a category of "active sports."

In this way, the profile analysis unit 116 acquires a purpose of the user at that position on the basis of the stay positions and the behavior recognition result.

Generating Profile on Basis of Transition Between Stay Positions

In addition, the profile can be generated, for example, on the basis of a history of transportation in transition between stay positions. The profile obtained through the profile generation process based on the transition between the stay positions indicates a behavior tendency of that person.

A spot at which the user stays for some time in the same place area is specified and an aggregated place from the latitude and longitude which is positional information is a stay position. From a history of transportation at the time of transition between the stay positions, it can be specified how a user moves from a certain stay position to a subsequent stay position. At this time, a feature motion at the time of seeing chronological transition between stay positions such as reciprocation between two stay positions or circling of a plurality of stay positions may be recognized as a feature behavior. The transition between the stay positions, the place names of the stay positions, and the transportation may be recorded on the server 10 including the information processing device 100 or may be recorded on an external server connected to be able to communicate with the information processing device 100. The profile analysis unit 116 acquires the information as a process result. In addition, the profile analysis unit 116 may acquire the information in tune with time information such as season or time.

The profile analysis unit 116 analyzes the transition between the stay positions and the transportation, specifies a behavior tendency, and sets the behavior tendency as a profile of the user. In addition, a profile category to which the profile belongs is specified on the basis of a relation between the preset profile and the profile category. The profile analysis unit 116 records the information on the profile DB 140.

FIGS. 15 to 17 illustrate examples of behavior tendency tables 144A to 1440 on which profiles of the behavior tendencies of the users are recorded. As illustrated in FIGS. 15 to 17, the behavior tendency tables 144A to 144C include, for example, a stay position transition (latitude and longitude) 144a, stay place transition (place name) 144b, transportation 144c, a feature behavior 144d, temporal information 144e, a profile 144f, and a profile category 144g. Results analyzed by the stay position transition 144a and the transportation 144c are recorded as the profile 144f and the profile category 144g. For example, in a case in which the user move with a "train" from a "home" to an "office," the profile analysis unit 116 analyzes that the user is "Person who uses train for commutation." The "Person who uses train for communication" belongs to a "train commuter."

In this way, when the transition between the stay positions and the transportation of each user are seen chronologically, a behavior tendency of the user such as lifestyle can be acquired. For example, it is known that a user A has the behavior tendency of "Train for weekday commutation and drive with automobile on holiday," as illustrated in FIG. 15. In addition, it is known that a user B the user has a behavior tendency "Train for weekday commutation and stop by on way from office," as illustrated in FIG. 16. A user C can know that the user has a behavior tendency "Use automobile to commute on weekday and use train to go out on holiday," as illustrated in FIG. 17.

Generating Profile on Basis of App Activation History and Behavior Recognition Result In addition to the above profile generation process, a profile can also be generated, for example, using an activation history of applications installed in a smartphone or a wearable terminal used by the user and a behavior recognition result. For example, FIG. 18 illustrates an example of a user behavior information table 146 in which a profile obtained on the basis of an app activation history and a behavior recognition result is recorded.

As illustrated in FIG. 18, the user behavior information table 146 includes, for example, an app activation history 146a, behavior information 146b, a feature behavior 146c, temporal information 146d, a profile 146e, and a profile category 146f. Results analyzed in accordance with the app activation history 146a and the behavior information 146b are recorded as the profile 146e and the profile category 146f. For example, in a case in which a "running" behavior is specified at the time of activation of a "music reproduction" app, the profile analysis unit 116 analyzes that the user is "jogging." The "jogging" belongs to a category of "active sports."

In this way, the profile analysis unit 116 can specify a behavior executed by the user in detail on the basis of the app activation history and the behavior recognition result.

b) Profile Matching Process

Figure 20:
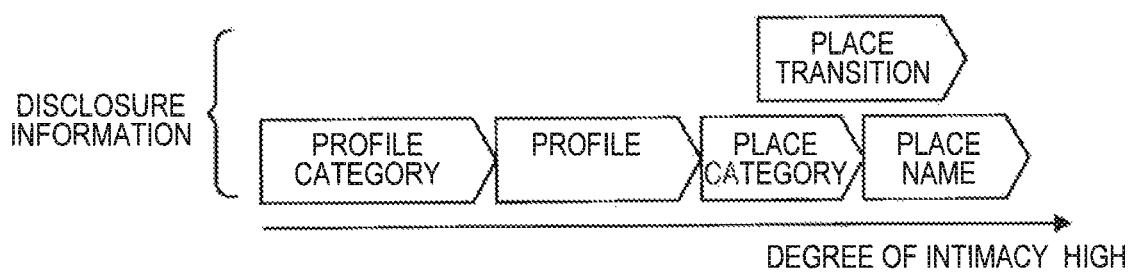
FIG. 20 is an explanatory diagram illustrating a relation between the degree of intimacy between users and disclosure information.

Next, a profile matching process according to the embodiment will be described in detail with reference to FIGS. 19 and 20. Also, FIG. 19 is an explanatory diagram illustrating a process of deciding a topic to be presented by matching of the profile. FIG. 20 is an explanatory diagram illustrating a relation between the degree of intimacy between users and disclosure information.

The profile analysis unit 116 matches the profile of the user who converses using the profile acquired in the above-described way and generates an appropriate topic. In a case in which a topic is supplied using latitude and longitude information which is positional information of the users, it is general to perform a process of supplying a topic related to the same positional information of each user. However, even when the positional information is the same, the topic related to the positional information rarely serves as a common topic to the users, for example, in a case in which purposes of the users at that position are different, and the topic is not suitable as content to be supplied in some cases. Accordingly, in the embodiment, by specifying a common profile using the profiles of the user who converse, it is possible to supply a more appropriate topic.

For example, it is assumed that there are profiles of the users A, B, and C illustrated in FIG. 19. Here, when only positional information (latitude and longitude or a place name) is considered in supply of topics in conversation of the users A and B, a topic related to "ABC ski resort" in which the positional information is the same may be supplied. However, a purpose of the user A in "ABC ski resort" is "snow sports" and a purpose of the user B is "trekking or mountain climbing." Accordingly, even when the topic, the fact that the users went to "ABC ski resort," is presented, there is a possibility of the topic being finished in regard to this common point.

Accordingly, the profile analysis unit 116 matches the profiles of the users A and B and generates a topic. In the profiles of the users A and B, there is common content "surfing." Although surfing places of the users A and B are different, a common hobby "surfing" can be searched for through the matching the profiles. The proficient field such as a hobby or content in which interest or concern is strong can provoke a kind of fellowship between the user and the conversation partner and easily animates the conversation. In this way, by matching the profiles, it is possible to supply an appropriate topic to the users.

In addition, for example, a case in which the user B or C is recommended as a communication partner to the user A will be considered. At this time, when only the positional information (latitude and longitude or a place name) is considered, there is a high possibility of each of the users B and C for which there is the same positional information being recommended to the user A from the content illustrated in FIG. 19. However, since the positions of the users are different at that position, there is a possibility of the topic being not appropriate.

Accordingly, the profile analysis unit 116 performs profiling the users B and C for the user A and recommends the user of which the profile or the profile category is identical as a discussion partner. In the example of FIG. 19, the user B of which the content "surfing" and "active sports" is the same as that of the user A is recommended as the discussion partner. Thus, the person considered to have many common topics can be recommended to the user A.

Here, of the information regarding the positional information illustrated in FIG. 19 or FIGS. 14 to 18, the place name or the place category and the transition between the stay positions are information indicating individual characteristics and is desired not to be disclosed at a first meeting or to a person who is not so intimate in some cases. For example, the user considers that the user does not want to disclose a place to which the user often executes. Even in this case, since granularity of information regarding the profile or the profile category is coarse and it is difficult to specify an individual using only the information, the information is appropriate as information used at the time of generation of the topic. Accordingly, in a situation in which a lot of information is desired not to be disclosed to a partner, the profile category may be set as matching information.

On the other hand, in a situation in which a lot of information may be disclosed to the partner, the profile analysis unit 116 may perform control such that information is disclosed step by step. For example, as the degree of intimacy of the conversation partner is higher, more specific information may be disclosed. As illustrated in FIG. 20, while the degree of intimacy of the user who converses is low, the profile category and the profile are disclosed and a topic is generated on the basis of the information. When the degree of intimacy increases, the place category, the place transition, and the place name are disclosed step by step and a topic more suitable to the individual can be generated. By disclosing the information step by step, it is possible to present a natural topic in which privacy of each user is considered and which is suitable for the degree of intimacy between the users.

The topic generation process of step S110 has been described above. Also, the topic generation process performed in the topic supply system 1 according to the embodiment is not limited to the above-described example, but topics may be generated in accordance with another method.

For example, a change in the conversation partner can also be supplied as a topic utilizing the sensor information. A person who has a high communication ability and is able to communicate smoothly by conversation, for example, by listening to the conversation partner and supplying an appropriate topic, immediately finds a change in an appearance of the partner and develops the conversation. For example, the person can be aware of a change in the partner, such as "Oh? Did you cut your hair?," "Oh? You got thin?," or "You got tanned!" and can develop conversation such as "Do you build up your body?" or "Did you go anywhere?." Accordingly, for example, a recognizer may compare an image of a partner who the user met previously to an image of the partner at the current time and causes the user to be aware of a change in the partner by performing highlight detection. Alternatively, when a partner is a type of person who is rarely aware of a change a user, a behavior log of the user may be given as a hint to the partner so that the partner can be aware of the change. For example, the hint may be given to the partner in a case in which the user wants to the person to be aware of a change such as a change in a hairstyle although the user does not say.

However, there are many topics which are not deliberately used as topics depending on a relationship with the conversation partner although the user is aware of the topics. Whether a change of the appearance is appropriate as a topic depends on a partner. Therefore, when a hint is given, the user may select the change as a topic in accordance with content of conversation until now or a relation with the partner.

[3.2. Topic Suggestion Process]

When the topics are generated in step S110, as illustrated in FIG. 3, a topic to be supplied to the user is extracted from the topics generated by the topic suggestion unit 120 (S120).

(1) Process for Conversation Communication

Figure 21:
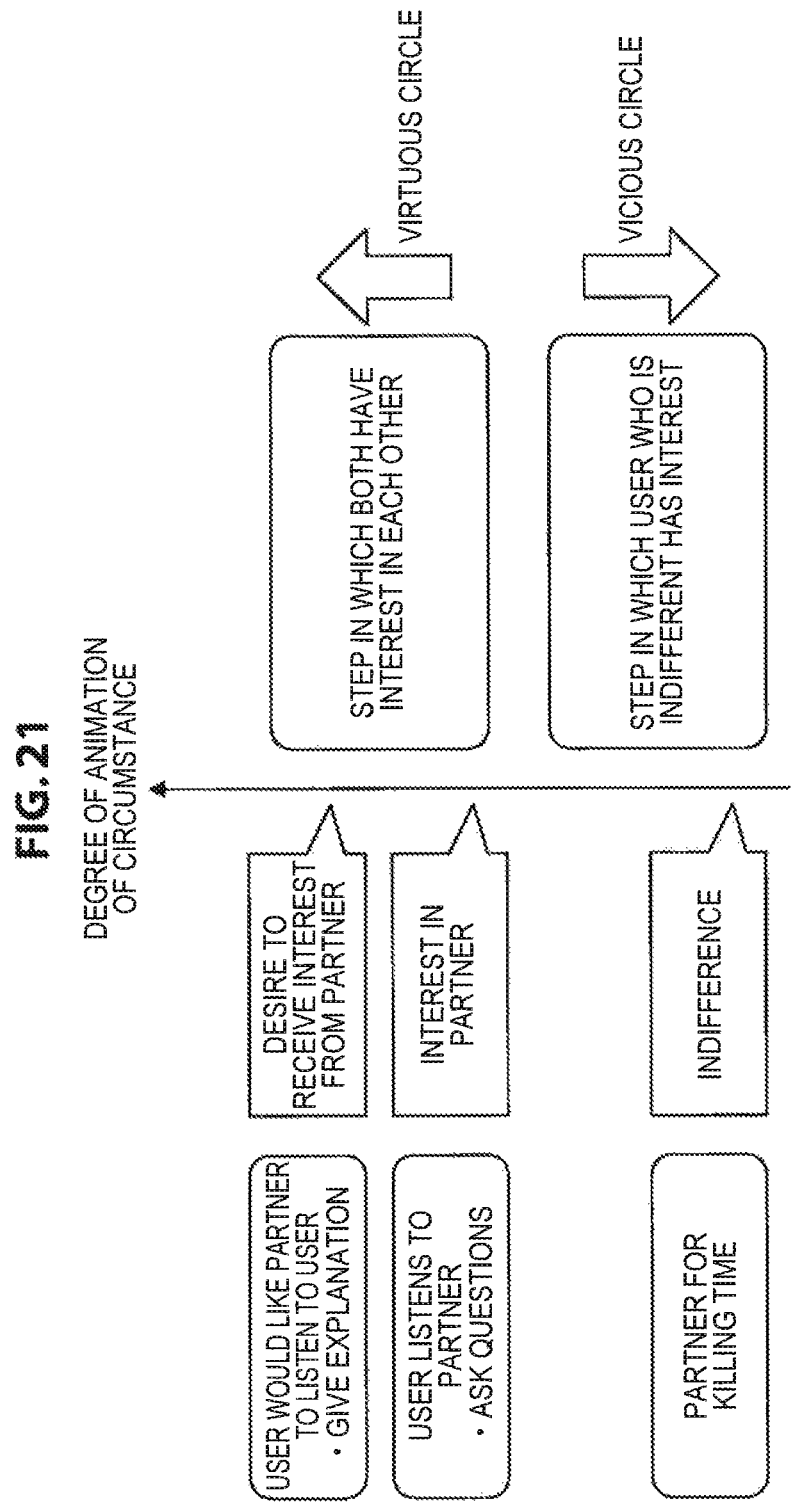
FIG. 21 is a conceptual diagram illustrating a process for conversation communication between users.

From a viewpoint of the process of step S120, a process for conversation communication between the users will first be described with reference to FIG. 21. FIG. 21 is a conceptual diagram illustrating a process for a conversation communication between users.

Reasons for executing the conversation communication or expected effects are diverse in accordance with use cases. The fact that continuing conversation communication favorably is repeating steps of listening and approval favorably is shared in all the use cases. The following three reasons for executing the conversation communication can be considered:

"indifference": a state in which communication is not established since a user is not interested in a partner;

"an interest in a partner": a state in which a user is interested in a partner and attempts to understand the partner; and "a desire to receive an interest from a partner": a state in which a user attempts to expect a partner to understand the user.

In the "indifference" state of the user to a conversation partner, conversation communication is performed to kill time. However, in the "interest in a partner" state, the user listens to the partner or asks questions. Further, when the user considers that "the user desires to receive an interest from a partner," the user considers that the user would like the partner to listen to the user and the user gives its explanation. That is, as illustrated in FIG. 21, in the "interest in a partner" state or the "desire to receive an interest from a partner" state, the conversation communication is easy. As an interest in the partner increases, the conversation is encouraged even when no topic is supplied by the topic supply system 1. In this state can be said to be a step in which both the user and the partner have an interest in each other.

On the other hand, an interest in the partner is low a state in which "the user has an interest in the partner" from "indifference." Therefore, when this state continues, the mutual interest decreases over time. This state is considered to be a step in which the user who is indifferent has an interest in the conversation partner and thus the conversation communication is in a virtuous circle. Accordingly, the topic supply system 1 performs a support to supply an appropriate topic and make the interest in the conversation partner strong enough for the conversation communication state in a virtuous circle.

(2) Evaluating Animation of Circumstance

Figure 22:
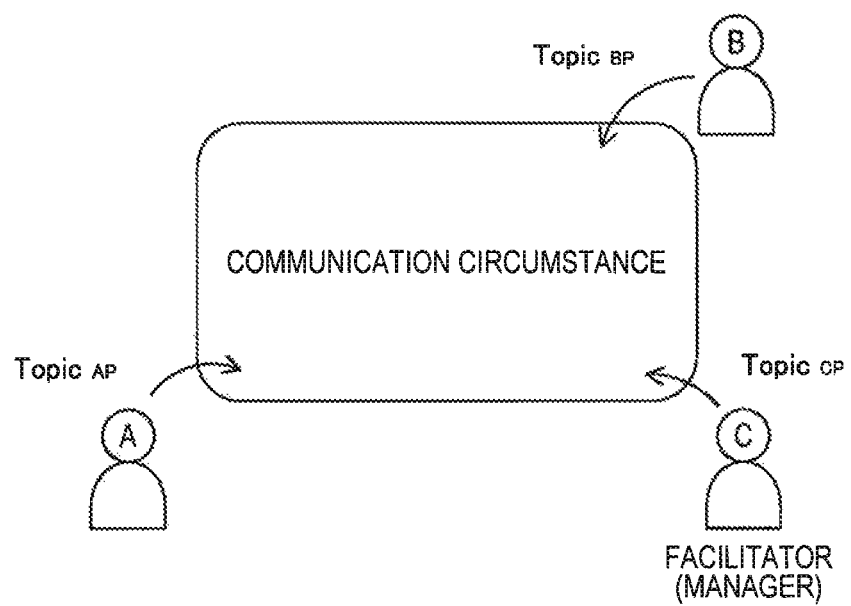
FIG. 22 is a conceptual diagram illustrating a concept of a communication circumstance and participants in the communication.

In the embodiment, the "degree of animation of circumstance" is introduced as an evaluation index for favorably continuing communication. A "circumstance" indicates a temporarily formed communication event. FIG. 22 is a conceptual diagram illustrating a concept of a communication circumstance and participants in the communication. In FIG. 22, a temporary communication circumstance is formed by three participants A, B, and C. The degree of animation of the circumstance is changed in accordance with the degree of animation of each participant. Here, the degree of animation $H_P$ of the circumstance is expressed in the following Expression (1). Here, env(t) is an environment change indicating that the circumstance is spoiled over time. The degree of animation $H_P$ of the circumstance is changed in accordance with the degrees of animation of $H_A$, $H_B$, and $H_C$ of the participants.

[Math. 1]

$$H_P(t) = H_A(t) + H_B(t) H_C(t) + \text{env}(t) \tag{1}$$

Here, it is assumed that the participants A, B, and C are party participants and the participant C is a facilitator who is a manager. In addition, the participant A has favor for the participant B. The degree of animation $H_A$ of the participant A can be expressed by the degree of interest $I_{AB}$ of the participant A in the participant B, which indicates that the participant A has favor for the participant B, as in the following Expression (2), the degree of interest $I_{BA}$ of the participant B in the participant A, and the degree of animation $H_P$ (t−1) of a circumstance at a certain time t−1. Here, ^ is an estimated value containing an error and $W_{AP}$ is a weight coefficient.

[Math. 2]

$$H_A(t) = I_{AB}(t) + \hat{I}_{BA}(t) + W_{AP} \times H_P(t-1) \tag{2}$$

The degree of animation $H_B$ the participant B is similarly represented in the following Expression (3).

[Math. 3]

$$H_B(t) = I_{BA}(t) + \hat{I}_{AB}(t) + W_{BP} \times H_P(t-1) \tag{3}$$

In addition, the degree of animation of the participant C who is the manger is expressed in the following Expression (4). Coefficients a, b, and $W_{CP}$ are coefficients that are changed in accordance with motivation of the participant C. For example, in a case in which the participant C contributes to only the animation of the circumstance, the degrees of interest of the participants A and B are irrelevant. Therefore, the coefficients b and c are zero. In addition, in a case in which the participant C has motivation for smoothly executing the communication between the participants A and B, the coefficients a, b, and $W_{CP}$ are set to predetermined values.

[Math. 4]

$$H_C(t) = a \times \hat{I}_{AB}(t) + b \times \hat{I}_{BA}(t) + W_{CP} \times H_P(t-1) \tag{4}$$

Here, the degree of interest $I_{BA}$ of the participant B in the participant A in the foregoing Expressions (2) to (4) is expressed in the following Expression (5). Terms relevant to conversation communication are a topic $\text{Topic}_{AP}$ introduced to the circumstance by the participant A and an introduction timing $\text{TopicTiming}_{AP}$. Here, α is an element other than conversation communication and is, for example, an impression of a personal figure.

[Math. 5]

$$I_{BA}(t) = f(\text{Topic}_{AP}, \text{TopicTiming}_{AP}, t) + \alpha \tag{5}$$

In addition, the degree of interest $\hat{I}_{AB}$ (indicates that ^ is added above $I_{AB}$ in Expression (6)) of the participant A in the participant B, which is estimated by the participant B is expressed in the following Expression (6). $\text{Reaction}_{AB}$ is a response of the participant A to a topic introduced by the participant B and can be estimated from, for example, a participant ratio in a topic of each participant, a smile face, a frequency of laughs or the like using sensor information or the like. For example, the participant ratio in a topic can be expressed on the basis of the number of times or a frequency of speeches or agreement reactions.

[Math. 6]

$$\hat{I}_{AB}(t) = f(\text{Reaction}_{AB}(\text{Topic}_{BP}, \text{TopicTiming}_{BP}), t) \tag{6}$$

From the foregoing Expressions (1) and (6), it can be understood that the degrees of animation $H_P$, $H_A$, and $H_B$ can be maintained in a good state by appropriately selecting a topic to be introduced to the circumstance. In addition, Expression (1) can be expressed as the following Expression (7). Here, $\text{Topic}_{XP}$ indicates a topic to be introduced to the circumstance by each participant and $\text{TopicTiming}_{XP}$ indicates an introduction timing of the topic. A function including Reaction is summarized as a Topic P function. W indicates a weight coefficient.

[Math. 7]

$$H_P(t) = \text{Topic}_P(\text{Topic}_{XP}, \text{TopicTiming}_{XP}, t) + W \times H_P(t-1) + \text{env}(t) \tag{7}$$

In the topic supply system 1, the foregoing values are used as evaluation values for selecting a topic. These values are calculated by the degree-of-animation calculation unit 122 of the topic suggestion unit 120 of the information processing device 100. The degree-of-animation calculation unit 122 outputs the calculated values to the topic extraction unit 124.

(3) Topic Selection Method

Figure 23:
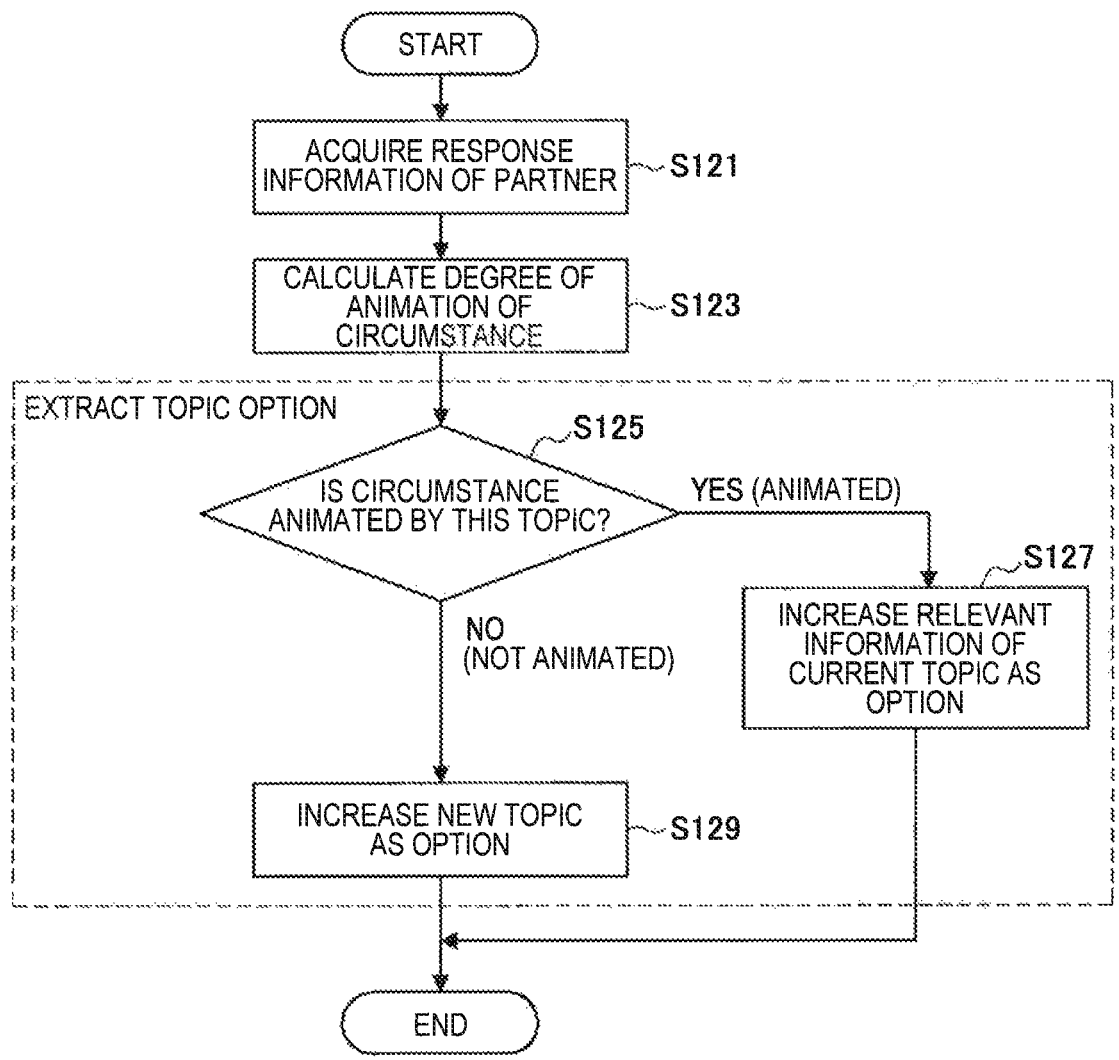
FIG. 23 is a flowchart illustrating a topic selection method according to the embodiment.

Next, a topic selection method of presenting a topic to the user by the topic extraction unit 124 will be described with reference to FIG. 23. Also, FIG. 23 is a flowchart illustrating the topic selection method according to the embodiment. The topic extraction unit 124 extracts a topic to be presented to the user from the topics generated by the topic generation unit 110 using the evaluation values calculated by the degree-of-animation calculation unit 122. A process illustrated in FIG. 23 is executed, for example, at a timing at which a topic is introduced to a circumstance.

As illustrated in FIG. 23, when the topic is introduced to the circumstance, the topic extraction unit 124 first acquires response information of the conversation partner (S121). The response information is information indicating a response of the conversation partner to the introduced topic and is, for example, a smile face, a laugh, a nod, and an agreement reaction. The response information is assumed to be information which can be frequently acquired as various kinds of sensor information. Specifically, the response information is a nod of the partner, such as "Uh-huh," an agreement reaction of the partner such as "Well?," "Interesting," "Indeed," or "I see," presentation of relevant information from the partner or a presentation frequency.

When response information of the conversation partner to the introduced topic is acquired, the topic extraction unit 124 calculates the degree of animation $H_P$ of the circumstance at that time (S123). The degree of animation $H_P$ of the circumstance can be calculated by the foregoing Expression (6). Then, when the degree of animation $H_P$ of the circumstance is calculated, the topic extraction unit 124 determines whether the circumstance is animated by the introduction of this topic (S125). Step S125 is determined in accordance with whether the degree of animation $H_P$ of the circumstance exceeds a predetermined threshold (hereinafter also referred to as an "animation degree threshold"). The animation degree threshold is set appropriately depending on a situation.

In a case in which the degree of animation $H_P$ of the circumstance is equal to or greater than the animation degree threshold in step S125, the topic extraction unit 124 determines that the circumstance is animated in accordance with the introduced topic and increases the relevant information of the current topic as an option of the topic to be presented to the participants (S127). Conversely, when the degree of animation $H_P$ of the circumstance is less than the animation degree threshold, it is determined that the circumstance is not animated in accordance with the introduced topic. Thus, the topic extraction unit 124 determines that the topic is changed from the current topic and increases a new topic as an option of the topic to be presented to the participants (S129).

Through the foregoing process, a topic corresponding to the animation of the circumstance is extracted from various topics generated by the topic generation unit 110 to be presented to the participants. Also, in the evaluation of step S125, a continuous time of the topic may be further considered. When the same or relevant topic is continued, it can be considered that the circumstance is animated. When different topics are presented in sequence, it can be considered that the circumstance is not so animated.

(4) Expectation of Animation of Circumstance in Accordance with Introduction of Topic Here, expectation of animation of a circumstance in accordance with introduction of a topic may be presented as the degree of expectation to the participants. Thus, the participants can select a topic to be introduced assuming the magnitude of animation of the circumstance in regard to each topic when each topic is introduced.

Figure 24:
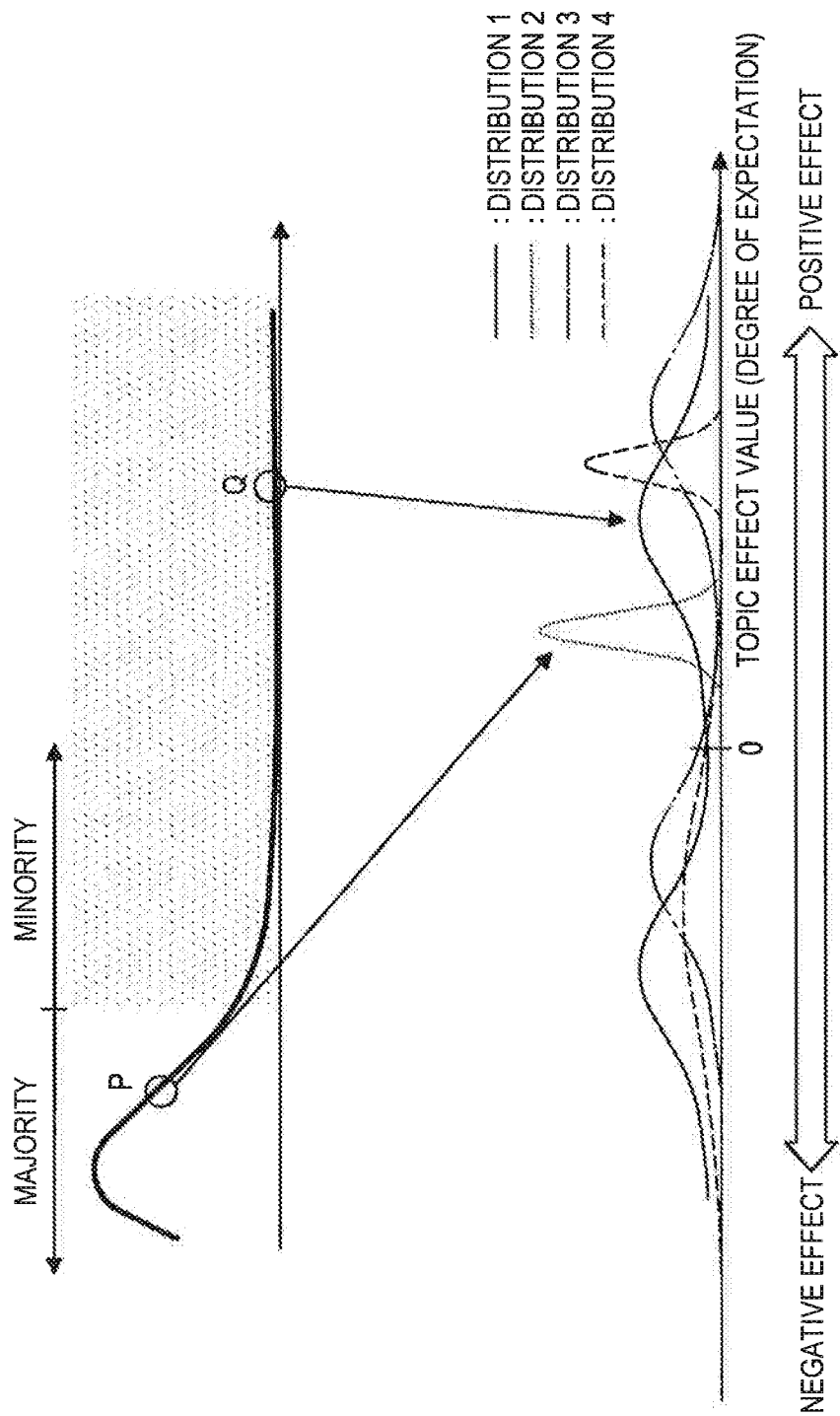
FIG. 24 is an explanatory diagram illustrating a distribution example of the degree of expectancy for a topic.

FIG. 24 is an explanatory diagram illustrating a distribution example of the degree of expectation for a topic. As illustrated on the upper side of FIG. 24, it is assumed that there is a distribution of a behavior tendency of a certain group. For example, a person corresponding to a point P in the distribution is allowed to select a topic that has a tendency of distribution 2 on the lower side of FIG. 24 and is generally small hit and miss. Specifically, a general topic such as weather does not have a high effect of animating the circumstance, but is a topic that is less likely to be missed. On the other hand, a topic which has a tendency of distribution 1 on the lower side of FIG. 24 may be supplied to a person corresponding to a point Q in the distribution on the upper side of FIG. 24. As in distribution 1, a topic which has a large expanse distribution and has a positive effect or a negative effect is, for example, a professional topic. For such a topic, there is a possibility of the circumstance being considerably animated, but there is also a possibility of the circumstance being considerably spoiled.

By presenting the degree of expectation to the animation of the circumstance to the participants in accordance with the introduction of the topic, a taste of the conversation partner can be understood, and thus a topic for which the more positive effect can be expected can be selected. For example, when there is a common field in which the participants are proficient in the circumstance and knowledge of the partner who can understand deep content is known, a topic that has an effect of distribution 3 in which a more positive effect can be expected can be selected as a topic. Also, Distribution 3 resembles distribution 1 and is a distribution in which a more positive effect than in a topic with distribution 1 can be expected and which is obtained by shifting distribution 1 wholly to the right side. Therefore, a possibility of a topic being missing is not negated. For example, despite professional conversation, there is a possibility of the topic not being animated due to a difference such as a difference in a detailed field of a taste or the same professional area.

In addition, for example, relevant information of a topic in which the conversation partner is strongly interested is also similarly shifted wholly to the right side. That is, since it is considered that distribution 2 which is a distribution of a general topic has a tendency to reliably animate a circumstance although the circumstance is not considerably animated and a circumstance is more reliably animated in regard to relevant information of a top in which the partner is very interested, it is considered that distribution 4 is formed by shifting distribution 2 wholly to the right side. The degree of expectation of the relevant information is shifted further to the right side as correlation with a presented topic is higher. Also, when the number of repetitions is large, there is a possibility of the degree of interest in the partner decreasing. In this case, there is a possibility of the degree of expectation being shifted wholly to the left side.

The degree of expectation indicating the expectation of animation of a circumstance is calculated by the degree-of-expectation calculation unit 126 of the topic suggestion unit 120. The degree-of-expectation calculation unit 126 outputs a calculated result to the topic presentation processing unit 130.

(5) Topic Introduction Timing

Figure 25:
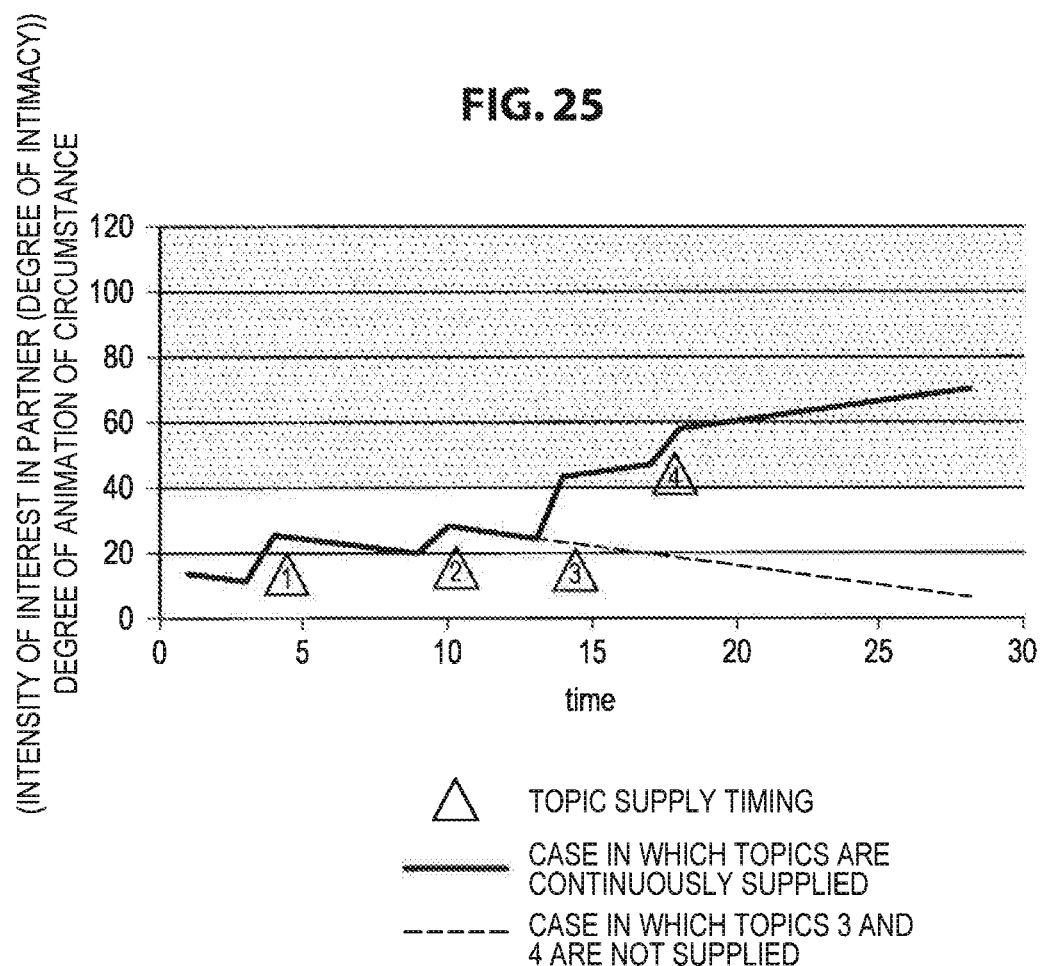
FIG. 25 is an explanatory diagram illustrating an example of a relation between topic introduction and the degree of animation.

Through the process of FIG. 23, as described above, the topic supply system 1 performs the support so that the introduction and the evaluation of the topic to the communication circumstance are repeated and the conversation is in a virtuous circle. FIG. 25 illustrates an example of a relation between topic introduction and the degree of animation of the circumstance. The degree of animation $H_P$ of a circumstance is calculated on the basis of Expression (1), as described above. In Expression (1), the environment term env(t) can lower the degree of animation in proportion to time and can raise the degree of animation in accordance with a topic to be discretely introduced. Accordingly, from time transition of the degree of animation, as illustrated in FIG. 25, it can be understood that there is a motion in which the degree of animation is raised temporarily at the time of introduction of a topic and subsequently the degree of animation is lowered over time.

For example, when a region in which conversation is in a virtuous circle is set as a region in which the degree of animation of a circumstance is equal to or greater than 40, the degree of animation exceeds 40 at a timing at which a third topic is introduced in the example illustrated in FIG. 25. When the degree of animation enters the region in the virtuous circle, the degree of animation in accordance with the environment term env(t) can be maintained or raised. Even when there is no support by the system, the circumstance of good communication can be maintained. When the third topic is not introduced, the communication circumstance is spontaneously spoiled. The topic supply system 1 has a purpose of producing a situation in which good communication is obtained despite no injection of a topic by appropriately introducing a topic.

The support of participants in a communication circumstance by the topic supply system 1 may be changed depending on a situation. For example, when a situation is not a situation in which a user desires to receive an interest from a partner, the support of the participants may be performed to the extent that the partner can have an interest. In addition, for example, in a case in which a user desires to receive an interest from a partner, the support of the participants is performed so that the circumstance is animated until this situation is achieved.

Figure 26:
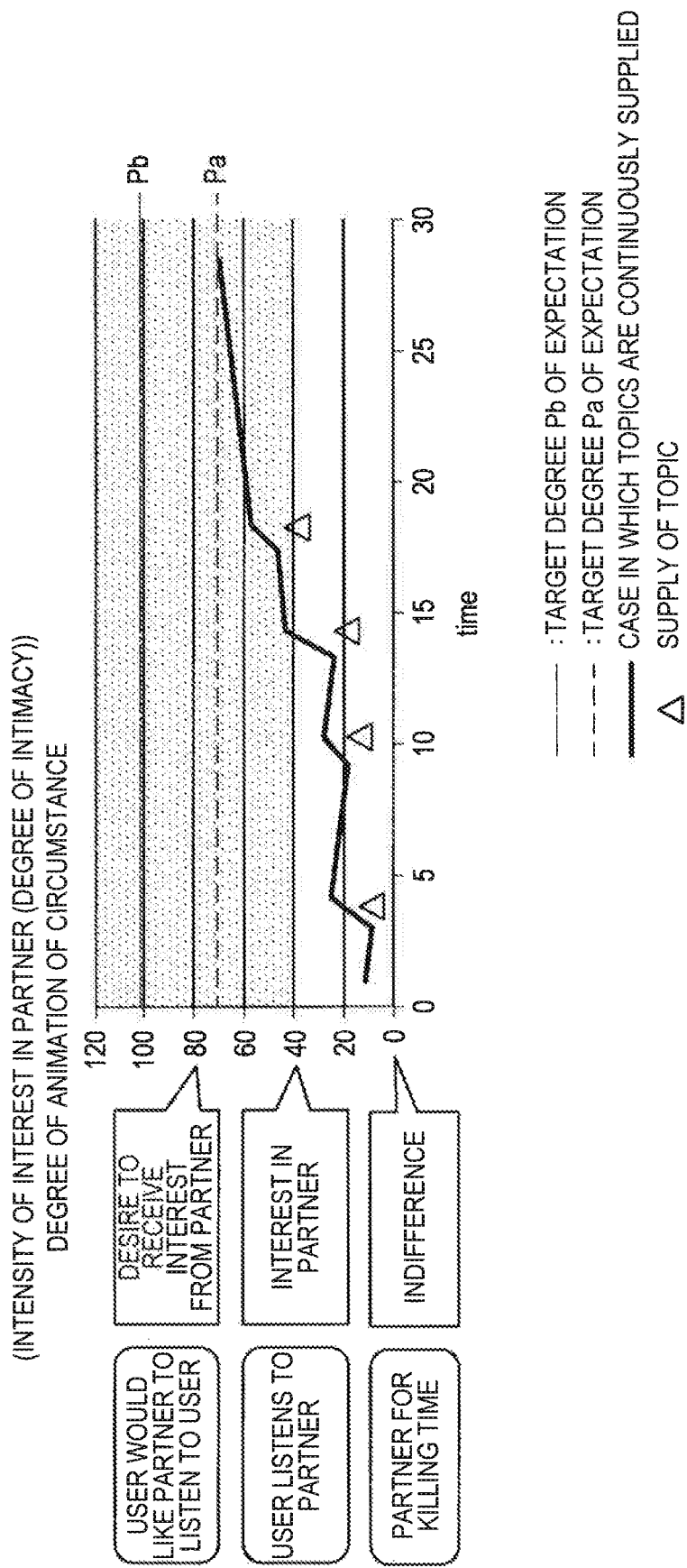
FIG. 26 is an explanatory diagram illustrating the degree of support by the topic supply system.

For example, as illustrated in FIG. 26, when a situation is not a situation in which a user desires to receive an interest from a partner, the topic supply system 1 supports participants until the degree of animation of a circumstance reaches a target degree Pa of expectation (for example, the degree of animation is in the range of 40 to 100) of a step in which the participants are interest in each other. When a situation is the situation in which a certain participant desires to receive an interest from the partner, the topic supply system 1 supports the participants until the degree of animation of the circumstance reaches a target degree Pb of expectation (for example, the degree of animation exceeds 100) of a step in which the participants desire to consider to have an interest in each other.

(6) Weighting Topic to be Presented

The topic suggestion unit 120 may analyze a situation and weight a topic to be presented when the topic extraction unit 124 extracts the topic. Thus, it is possible to suggest a topic more appropriate for a situation.

Situations of a communication circumstance can be broadly classified into three states, that is, a state before a common event common to participants who participate in the circumstance (state A), a state during the common event (state B), and a state after the common event (state C). FIG. 28 illustrates specific situation examples.

For example, in a front chamber in which people wait for wedding reception, a facilitator who serves the people at that time is absent and people happen to sit next to each other and have one-to-one conversation, for example, to kill time until the wedding reception starts in some cases. This situation corresponds to state A in FIG. 27 because of the state before the common event, the wedding reception. On the other hand, the time killing until the party after the wedding reception corresponds to state C in FIG. 27 because of the state after end of the common event, the wedding reception.

In addition, for example, in a train on the way home from a welcome party, people who return home in the same direction are in that circumstance, but only two persons who are not so intimate are in that circumstance. In this case, since a situation is a situation in which the persons converse to avoid silence and is a situation after a common event, the welcome party ends, the situation corresponds to the state C in FIG. 27. Further, for example, a matchmaking party is a party in which people who request a meeting participate. Normally, there is a facilitator who is a manager assembling that circumstance. It is considered that there are people who first meet in the matchmaking party and it is considered that the motivation for being intimate is high. The situation, the matchmaking party, corresponds to the state B in FIG. 27 since the situation is during a common event.

Figure 27:
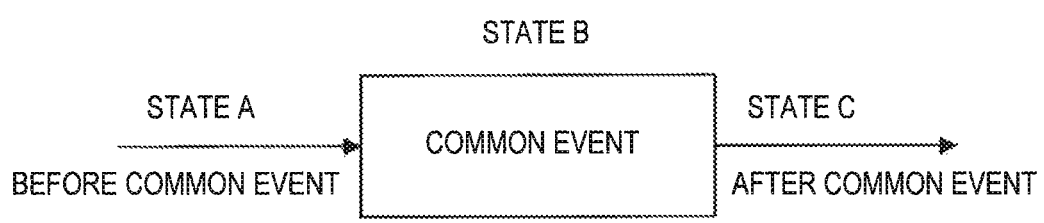
FIG. 27 is a Model diagram for describing state classification of situations of a communication circumstance.

When such a situation is used as circumstance state information of communication, whether a topic is continued or a topic is added or switched can be adjusted by performing weighting in a direction of a topic to be presented. FIG. 29 illustrates an example of a direction of a topic corresponding to a situation. In FIG. 29, directions of topics in states A to C illustrated in FIG. 27 are illustrated.

As illustrated in FIG. 29, the state A before the common event is a phase for searching for a topic which attracts mutual interest. Accordingly, rather than continuing a topic, it is better to add a new topic to a topic to be suggested and suggest the topic in order to search for a topic in which a partner is interested. In a case in which the degree of interest of the partner is low, it is effective to request a switch to a new topic. When an appropriate topic is found, the topic is continued.

In addition, since a topic is supplied in accordance with the common event in the state B during the common event, addition of a new topic or suggestion of a switch may not be basically performed. In this state, the topic supply system 1 presents the relevant information and allows the topic to be continued.

In the state C after the common event, when events are looked back in the common event, there are already many topics. In this state, the topic supply system 1 may present the relevant information and allow the topic to be continued.

In this way, since the communication circumstance state can be known, the topic supply system 1 can supply a more appropriate topic.

[3.3. Topic Presentation Process]

When the topics presented in step S130 are extracted, as illustrated in FIG. 3, the topic presentation processing unit 130 performs a process of supplying the topics to the user (S130). The topic presentation processing unit 130 presents the topics to the user or plural people sharing the topics depending on a situation of that circumstance.

(1) Presenting Topic to Individual

First, a case in which the topic supply system 1 presents a topic to an individual will be described. As a method of presenting a topic to an individual, for example, presenting a topic on a display panel of a glasses type wearable terminal or presenting a topic by emitting light form an LED in a device carried by the individual or a space is considered as a method of visually presenting the topic. As an audible presentation method of, for example, an earphone or an open speaker can also be used. In addition, as an auditory or a force-sensitive presentation method, for example, vibration or temperature can be used. In a case in which a topic is presented to an individual, the topic may be presented naturally without being noticed around.

Figure 30:
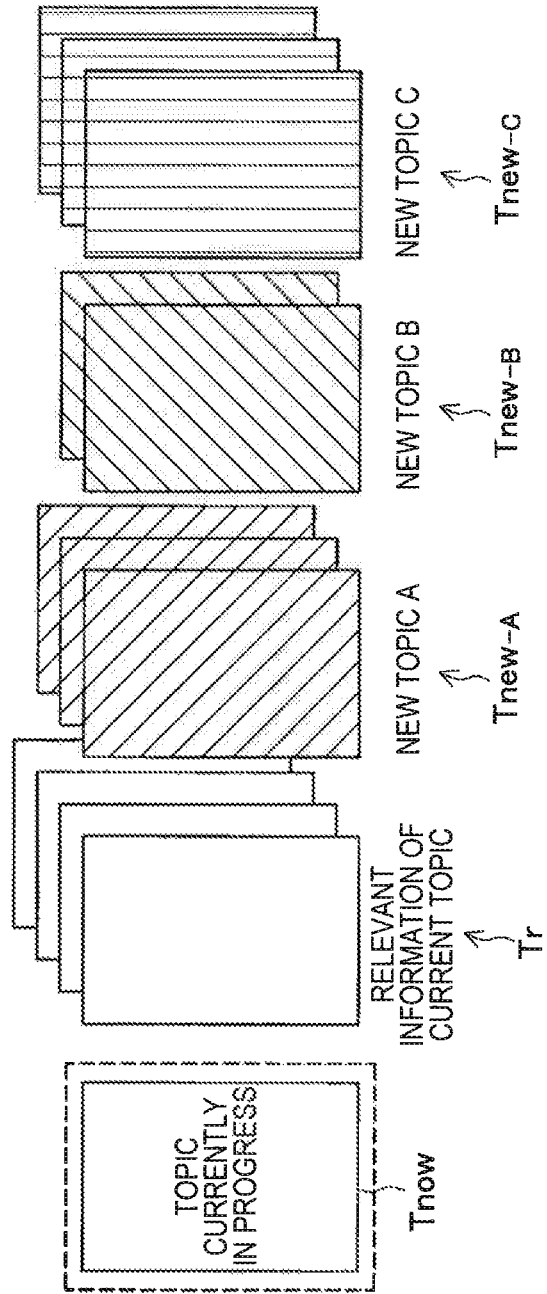
FIG. 30 is an explanatory diagram illustrating a topic presentation example on a display panel of a glasses type wearable terminal.

FIG. 30 illustrates an example in which a topic is presented on a display panel of a glasses type wearable terminal. FIG. 30 illustrates an example in which a topic is displayed in a card type on the display panel of the glasses type wearable terminal worn by a user. A card Tnow of a topic which is currently in progress, a card Tr of relevant information of the current topic, and cards Tnew-A, Tnew-B, and Tnew-C of new topics are displayed on the display panel. The depths of the card Tr of the relevant information and the cards Tnew-A, Tnew-B, and Tnew-C of the new topics indicate extension of the relevant information regarding the topics. At this time, the degree of animation of the circumstance or the degree of expectation at the time of introduction of a topic to be presented may be presented to the user on the display panel or in accordance with another presentation method.

The user can supply the topic with reference to the card of the presented topic. The topic selected by the user is a new topic which is currently in progress. After the degree of animation of the circumstance or the like in accordance with introduction of the topic is calculated, new relevant information and a new topic are displayed on the display panel.

(2) Presenting Topic to Plural People

Next, a case in which the topic supply system 1 presents a topic to plural people who participate in a communication circumstance will be described. As a method of presenting a topic to plural people, for example, presenting a topic to a projection surface such as a tabletop using a projector is considered as a visual presentation method. In addition, as an audible presentation method of, for example, a speaker or the like can be used. As a tactile presentation method, for example, air conditioning or adjustment of temperature of a table or the like can also be performed. In a case in which a topic is presented to plural people, an entertainment element such as animation of a circumstance can also be given in addition to presentation of the topic.

Figure 31:
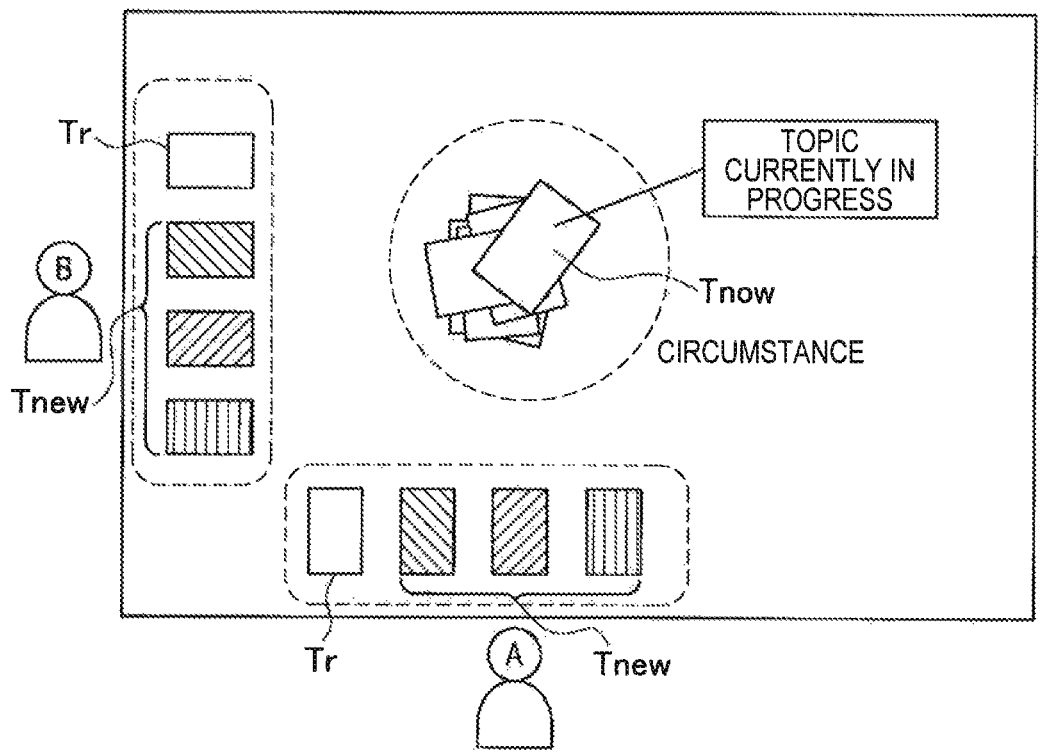
FIG. 31 is an explanatory diagram illustrating an example in which a topic is presented with a topic card on a tabletop by a projector.

FIG. 31 illustrates a presentation example of a topic with a topic card on a tabletop by a projector. In this example, a card of a topic currently in progress, a card of the relevant information of the topic currently in progress, and a card of a new topic are displayed on the tabletop. A circumstance in which the card currently in progress is displayed is on the tabletop. A topic is introduced to the circumstance when the user swipes the card of the relevant information or the card of the new topic displayed at hand of the users A and B participating in the communication circumstance toward the circumstance. At this time, the topics of the cards which the users A and B have are shown. In this way, entertainment can be given when topic candidates to be introduced to the circumstance can be seen mutually.

Figure 32:
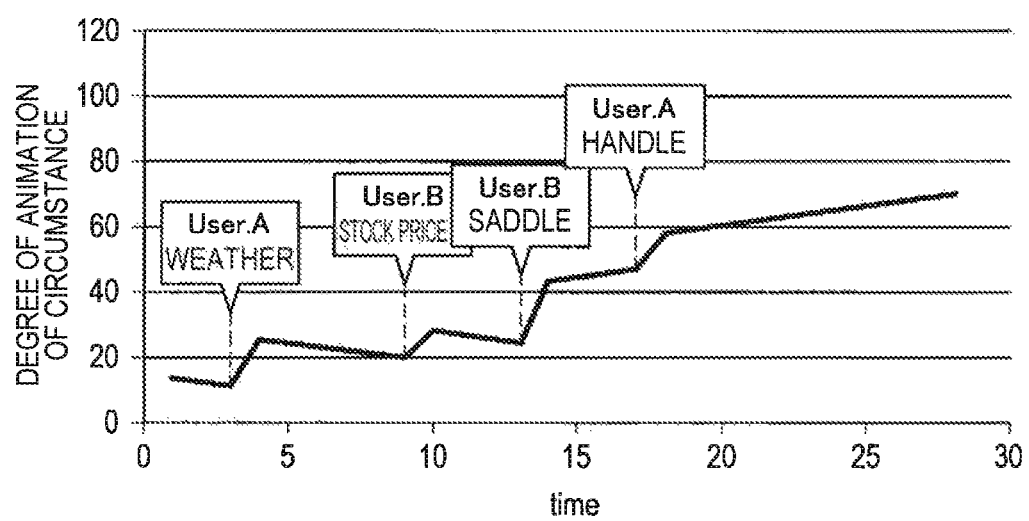
FIG. 32 is an explanatory diagram illustrating a presentation example of a change in the degree of animation.

Further, the degree of animation of the circumstance, the name of a user dominating a topic, and information regarding the degree of contribution to animation of the topic may be presented to the participants. For example, transition of the degree of animation calculated by the degree-of-animation calculation unit 122 may be presented. For example, as illustrated in FIG. 32, the transition of the degree of animation of the circumstance may be displayed as a graph. At this time, in a case in which a talker introducing the topic can be recognized, a topic suggester may be displayed. Further, in a case in which the suggested topic can be recognized, the topic may be displayed with a tag. The display of the topic may be automatically recognized on the basis of sensor information or may be manually input by a participant or the like. The transition of the degree of animation may be displayed to be shared so that all of the participant can see the transition of the degree of animation. In a case in which a facilitator is in the circumstance, the facilitator may be individually displayed. The facilitator can take a behavior to further animate the circumstance with reference to the information.

In addition, the degree of contribution to a topic may be presented to each participant. The information may also be displayed to be shared so that all of the participants can see the information. In a case in which a facilitator is in the circumstance, the facilitator may be individually displayed. The facilitator can take a behavior to reject conversation of a person who does not say naturally while seeing the degree of contribution to the topic.

Further, the topic presentation processing unit 130 of the topic supply system 1 may have a function of praising a person in a case in which the person presents a topic for animation. As the presentation for praising the person presenting the topic for animation, for example, "Good!" can be considered to be displayed on the display panel of the glasses type wearable terminal or vibration such as patting of a head can be considered to be reproduced. In addition, the user can also be praised by displaying a smiling avatar on the display panel or the like or turning on and off an LED with green.

In contrast, in a case in which the circumstance is spoiled by a supplied topic, directing may be performed. In this case, for example, "Bad↓" may be displayed on the display panel of the glasses type wearable terminal or vibration such as poking of a head may be reproduced. In addition, the fact that the circumstance is spoiled can also be presented to the user by displaying a frowning avatar on the display panel or the like or turning on and off an LED with red.

There is also a possibility of the above-described display of the graph display or the display of the degree of contribution being a topic of conversation. Here, directing may be performed so that a space is specialized and animated. For example, in a case in which a circumstance is spoiled, a sound of air conditioning may be increased to emphasize silence or air-cooling is entered by using air conditioning. In addition, an atmosphere of a circumstance may be produced with spotlight using a light source. For example, in a case in which a circumstance is in a warm atmosphere, warm-color illumination is provided. When an introduced topic is excluded, darkening is provided. Further, when a conversation is serious, the participants of the circumstance may hear their beating or a beating sound taster than the beating by using a sound.

(3) Modification Examples of Presentation Method

Topic Presentation Method

The method of presenting topics in the topic supply system 1 according to the embodiment is not limited to the example illustrated in FIG. 30 or 31. For example, presentation of information is not limited to text. For example, a topic may be presented to a user by displaying an icon. Specifically, in a case in which a topic regarding a bicycle is indicated, an icon of a bicycle image may be displayed. In a case in which a past episode is presented as a topic, a photo at the time of that event may be displayed.

Figure 33:
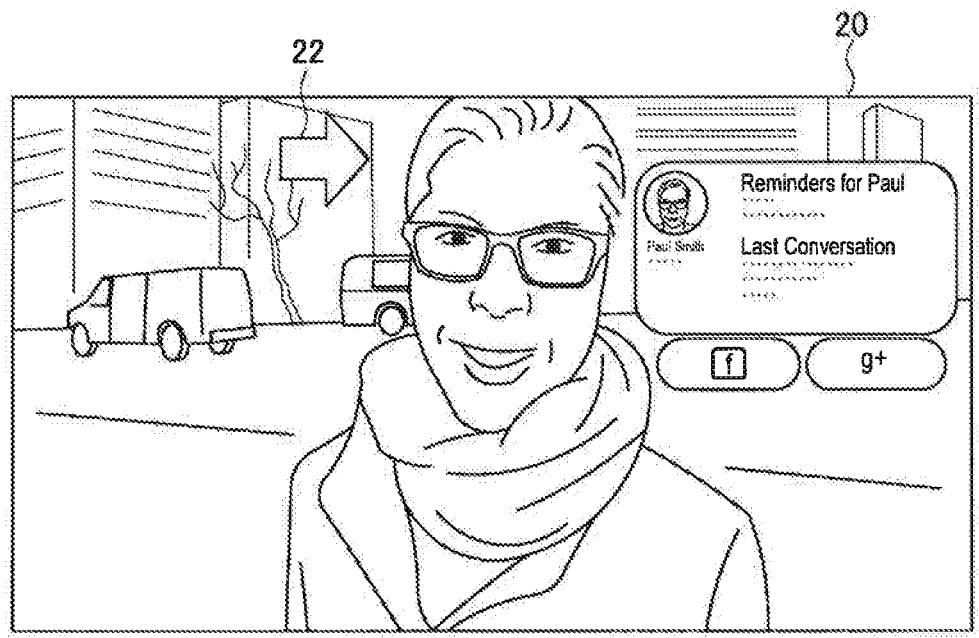
FIG. 33 is an explanatory diagram illustrating a method of presenting a topic with an arrow.

In addition, a topic may be presented with an arrow. For example, as illustrated in FIG. 33, when a user sees a conversation partner via a display panel 20 of a glasses type wearable terminal, an arrow 22 pointing the hair of the conversation partner may be displayed to present a topic in a case in which the fact that the conversation partner cuts his or her hair is recognized in the topic supply system 1. In this way, when there is a topic in information displayed on a display unit, the topic can be presented by pointing the topic with an arrow.

Figure 34:
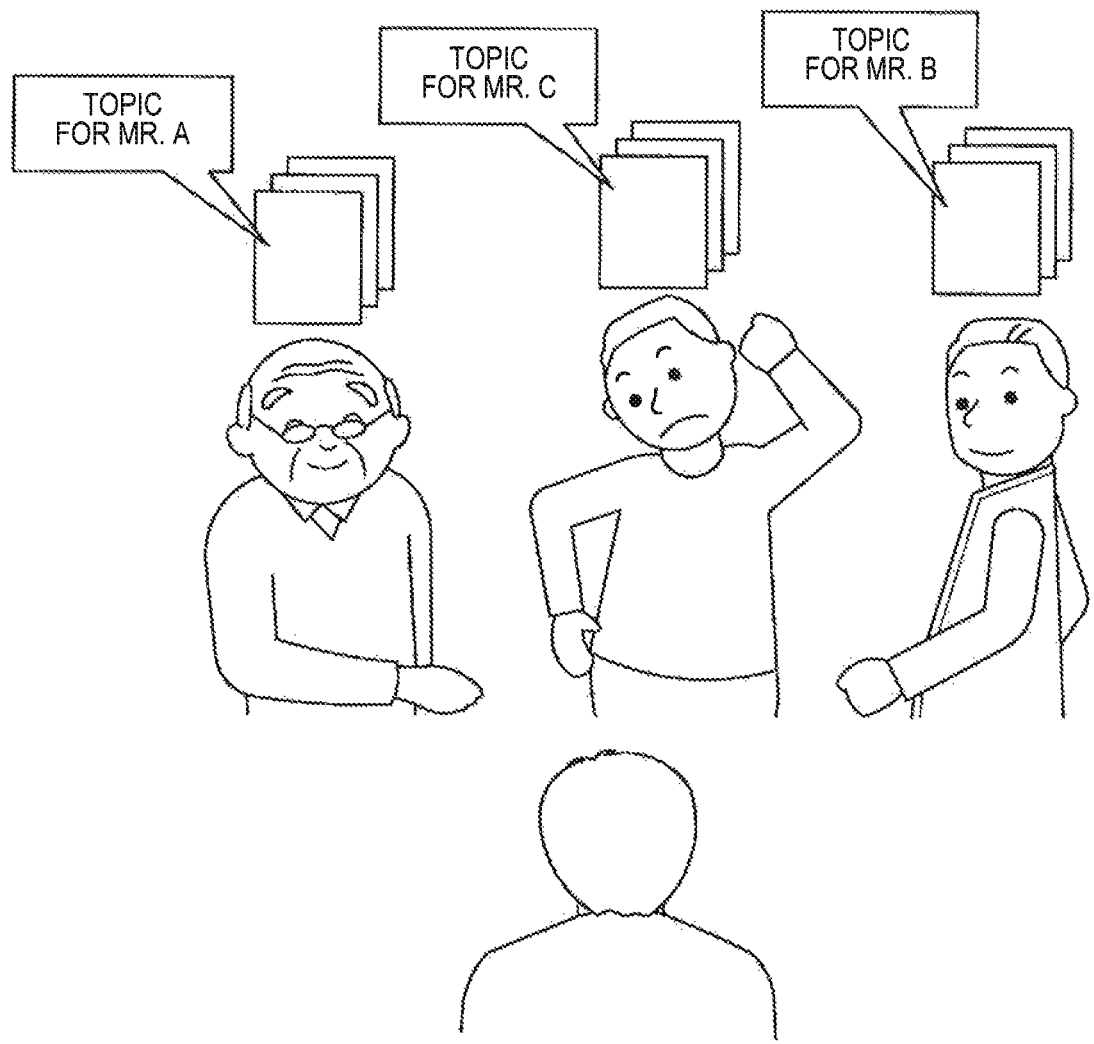
FIG. 34 is an explanatory diagram illustrating a presentation method of displaying a topic for each conversation partner.

Further, the presented topic may not be displayed in an equal column, as illustrated in FIG. 30. For example, as illustrated in FIG. 34, in a case in which there are a plurality of conversation partners, a topic in accordance with each conversation partner may be displayed in association with each person. Thus, a topic in accordance with each conversation partner can be visually recognized. Also, when a topic is common to all of the conversation partners, for example, the common topic may be displayed in the middle of a screen.

Topic Display Timing

In addition, a topic may not be presented normally. Only when a topic is presented, a card may be automatically presented on a glasses type wearable terminal or on a tabletop. Alternatively, only in a case in which an instruction of a user is received, a topic may be presented. For example, only when the user matches his or her visual line to a specific icon to display a topic or matches a cursor with a controller, the topic may be presented on the glasses type wearable terminal or on the tabletop.

Topic Presentation Destination

Further, a topic presentation destination is not limited to the glasses type wearable terminal or the tabletop. For example, a list of the extracted topic candidates may be displayed on a device such as a smartphone, a tablet terminal, or a band belonging to an individual. In a case in which a topic is presented on the device, there is a possibility of the user not noticing that the topic is presented. Accordingly, for example, the user may be notified at the time of completion of topic preparation, and thus the user may be guided so that the user can see the presented topic. As a specific notification method, a sound is made from only a device of a related person or a sound of a bell may be produced so that a topic switch timing is instructed to all of the users. Alternatively, a band worn by the user may be vibrated so that the user is notified. In addition, sound notification and display notification may be combined and only an index is delivered with a sound so that the list may be acquired as an image.

Directing of Display or Non-Display

Figure 35:
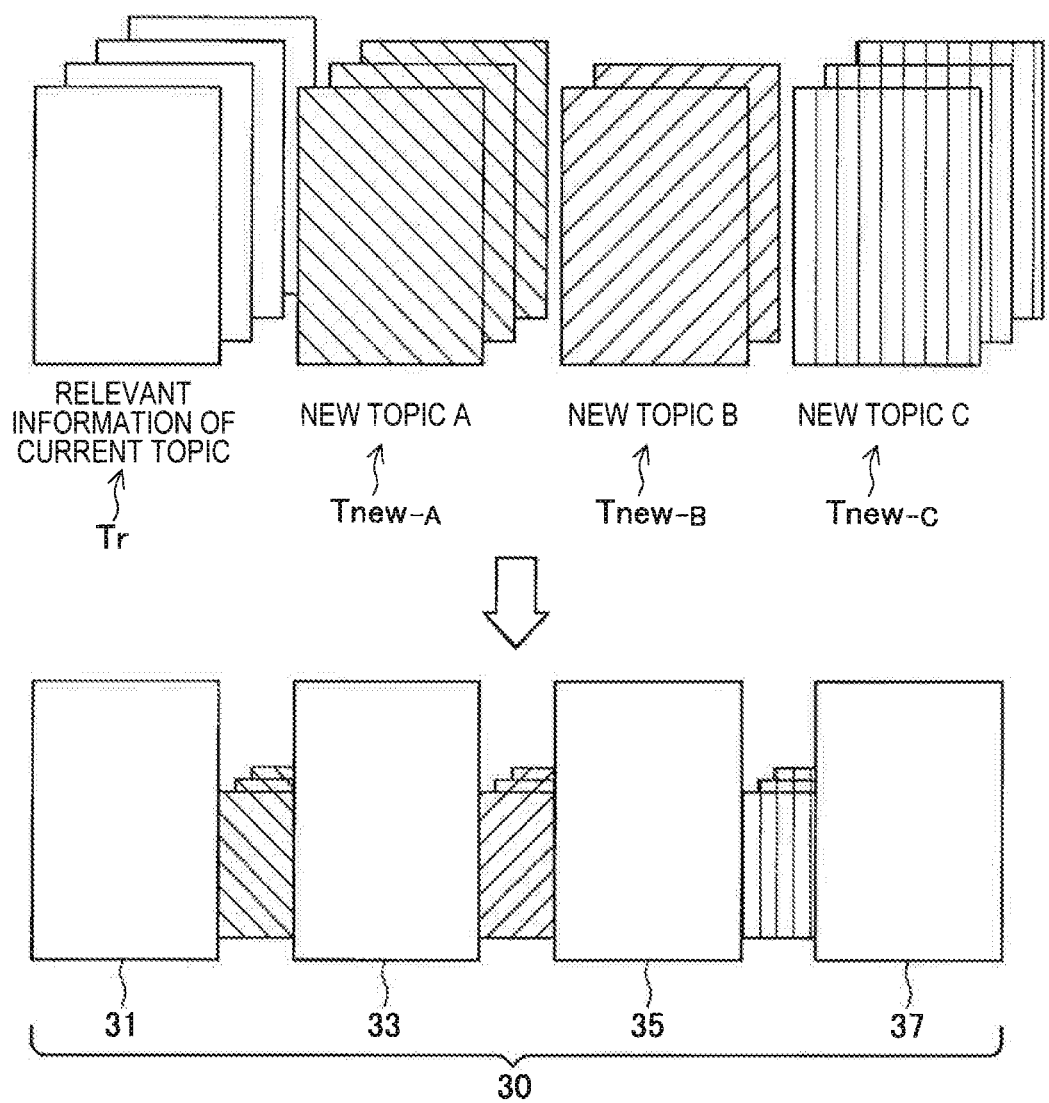
FIG. 35 is an explanatory diagram illustrating an example of a display directing for hiding a topic in accordance with motions of other users.

In addition, in a case in which plural people participating in conversation can each see cards as in a case in which topics are displayed on the tabletop illustrated in FIG. 31, directing may be added to the display of the cards on the basis of visual lines or actions of the participants. For example, when the user gazes at cards belonging to the user, the card group may be unfolded. When the user takes away his or her visual line from the card group, the card group may be folded. Alternatively, as illustrated in FIG. 35, when an operation in which another user looks into cards held by the user is detected, card hiding panels 30 (31, 33, 35, and 37) may be displayed and the cards are turned back the panels 30 to hide the cards. Also, the unfolding, folding, and hiding display of the card group may be performed on the basis of a visual line of the user or may be manipulated using a controller or the like.

Emphasis of Game Element

Further, a virtual host may be set to emphasize a game element. For example, a system in which players (participants) submit topics to the virtual host and the host selects the topics submitted from the players may be realized. The host may select the topics in a majority decision manner or at random. Of course, the host may be replaced with a facilitator so that the topics may be selected manually.

Recognition of Topic Selection by User

To present or statistically display the above-described relevant topics, it is necessary for the topic supply system 1 to know which topics have been selected until now. This recognition may be performed through automatic recognition based on words or the like. Alternatively, various manipulations such as a touch manipulation on a tabletop or the like, a slide manipulation on a bracelet worn by the user, a tap manipulation on a device, a visual line manipulation, and a manipulation of deciding a topic by selecting the topic with a visual line and nodding may be manually recognized and a selected topic may be recognized.

In addition, when the automatic or manual recognition of the topic selection can be realized, "directing based on selection of a topic" such as emphasis expression at the time of non-selection despite posting of a topic can be realized. For example, a selected and bought topic can be emphasized by quivering or blinking a displayed card. In addition, in a case in which no topic is selected, a user can also be prompted to select a topic by giving vibration to the user. Directing at the time of non-selection of a topic may be performed, for example, in a case in which a topic is presented and a given time elapses or a case in which conversation runs out.

<4. Conclusion>

The configuration of the topic supply system 1 and the topic supply method in the topic supply system 1 according to the embodiment have been described above. According to an embodiment of the present disclosure, the information processing device 100 of the topic supply system 1 generates topics for a conversation partner on the basis of a comparison result between a certain behavior of a user and the comparison information regarding the behavior and decides topic candidates to be suggested to a user from the generated topic. Then, the information processing device 100 suggests an appropriate topic corresponding to a communication circumstance in which topics are supplied. Thus, the user can obtain the topic to start conversation with the partner even in communication with a person who is so unacquainted and execute good communication.

<5. Hardware Configuration>

Figure 36:
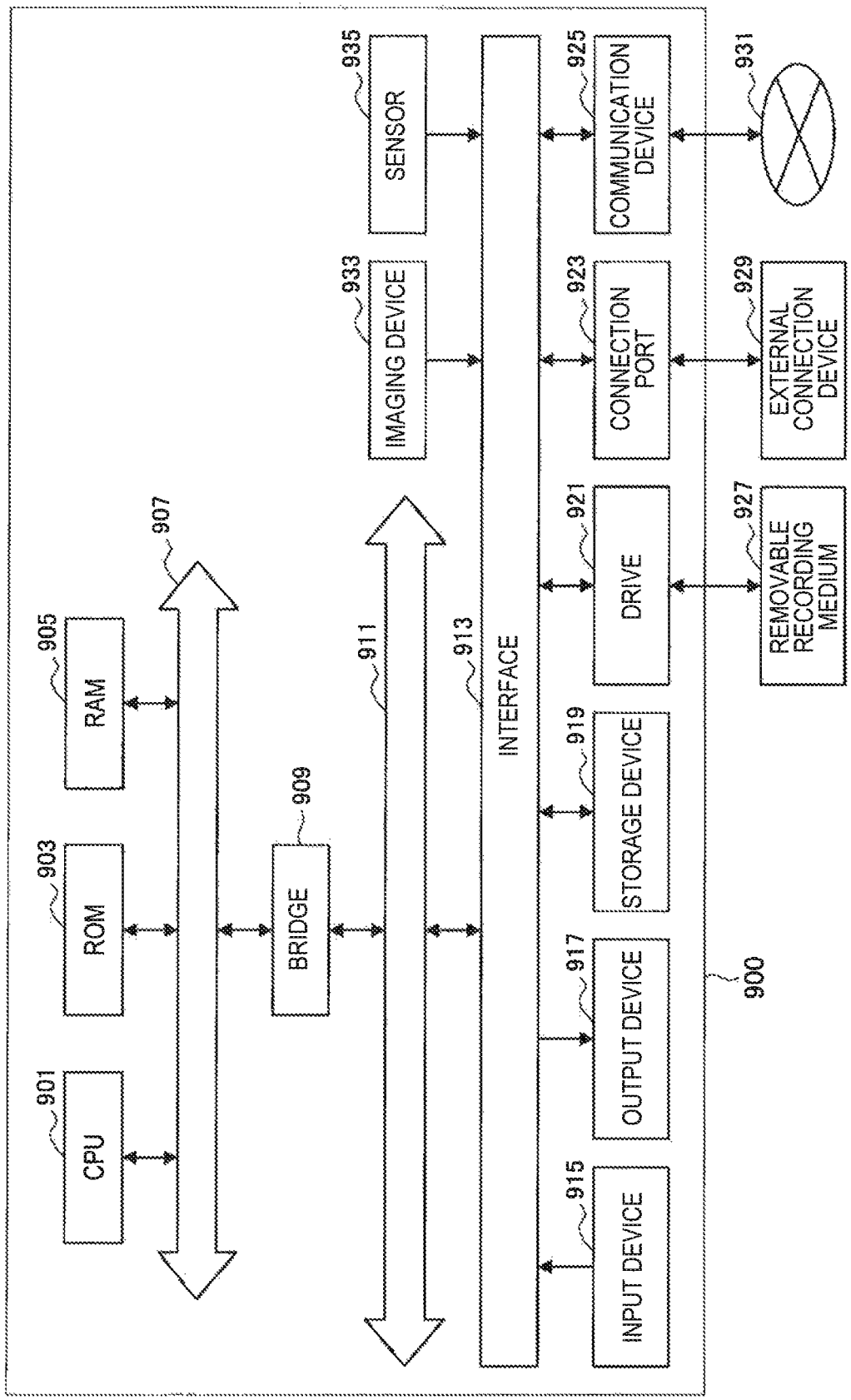
FIG. 36 is a hardware configuration diagram illustrating a hardware configuration of an information processing device according to an embodiment of the present disclosure.

Next, with reference to FIG. 36, a hardware configuration of an information processing device according to an embodiment of the present disclosure is explained. FIG. 36 is a block diagram illustrating a hardware configuration example of an information processing device according to the embodiment of the present disclosure. The illustrated information processing device 900 can realizes, for example, the server 10 in the foregoing embodiment.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touch panel, a button, a switch, and a lever. The input device 915 may be a remote control device that uses, for example, infrared radiation and another type of radiowave. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. A user inputs various types of data to the information processing device 900 and instructs the information processing device 900 to perform a processing operation by operating the input device 915.

The output device 917 includes an apparatus that can report acquired information to a user visually, audibly, or haptically. The output device 917 may be, for example, a display device such as a liquid crystal display (LCD) or an organic electro-luminescence (EL) display, an audio output device such as a speaker or a headphone, or a vibrator. The output device 917 outputs a result obtained through a process performed by the information processing device 900, in the form of video such as text and an image, sounds such as voice and audio sounds, or vibration.

The storage device 919 is an apparatus for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. Further, the drive 921 writes the record into the mounted removable recording medium 927.

The connection port 923 is a port used to connect devices to the information processing device 900. The connection port 923 may include a Universal Serial Bus (USB) port, an IEEE1394 port, and a Small Computer System Interface (SCSI) port. The connection port 923 may further include an RS-232C port, an optical audio terminal, a High-Definition Multimedia interface (HDMI) (registered trademark) port, and so on. The connection of the external connection device 929 to the connection port 923 makes it possible to exchange various data between the information processing device 900 and the external connection device 929.

The communication device 925 is a communication interface including, for example, a communication device for connection to a communication network 931. The communication device 925 may be, for example, a communication card for a local area network (LAN), Bluetooth (registered trademark), Wi-Fi, or a wireless USB (WUSB). Further, the communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 may include, for example, the Internet, a home LAN, infrared communication, radio communication, or satellite communication.

The imaging device 933 is an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging device 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing device 900 such as a posture of a housing of the information processing device 900, and information regarding an environment surrounding the information processing device 900 such as luminous intensity and noise around the information processing device 900. The sensor 935 may include a GPS receiver that receives a global navigation satellite system (GLASS) signals to measure latitude, longitude, and altitude of the apparatus.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

<6. Supplement>

The embodiments of the present disclosure may include, for example, the above-described information processing device (for example, a server), the above-described system, the information processing method executed by the information processing device or the system, a program for causing the information processing device to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a topic generation unit configured to generate topics with a conversation partner on the basis of a comparison result between a certain behavior of a user and comparison information regarding the behavior; and a topic suggestion unit configured to decide a topic candidate to be suggested to the user from the generated topics, (2)

The information processing device according to (1), in which a usual behavior of the user in regard to the certain behavior is used as the comparison information, and in a case in which a recent behavior of the user is different from the usual behavior of the user, the topic generation unit generates content of the recent behavior of the user as the topic.

(3)

The information processing device according to (1) or (2), in which a previous behavior tendency of the user in regard to the certain behavior is used as the comparison information, and in a case in which a recent behavior tendency of the user is changed from the previous behavior tendency of the user, the topic generation unit generates a change in the behavior tendency of the user as the topic.

(4)

The information processing device according to any one of (1) to (3), in which a previous behavior tendency of the user in regard to the certain behavior is used as the comparison information, and in a case in which a behavior tendency of the user in a certain previous section is different from a behavior tendency of the user in another previous section and a recent behavior tendency of the user, the topic generation unit generates a change in the behavior tendency of the user as the topic.

(5)

The information processing device according to any one of (1) to (4), in which a behavior tendency of the conversation partner in regard to a common behavior executed by the user and the conversation partner is used as the comparison information, and in a case in which a behavior of the user and a behavior tendency of the conversation partner in regard to a certain common behavior are different, the topic generation unit generates information regarding the common behavior as the topic.

(6)

The information processing device according to (5), in which the topic generation unit determines a difference in a behavior between the user and the conversation partner on the basis of an occurrence frequency of the common behavior.

(7)

The information processing device according to (5), in which the topic generation unit determines a difference in a behavior between the user and the conversation partner on the basis of subordinate information regarding the common behavior.

(8)

The information processing device according to any one of (1) to (7), in which a behavior tendency of the conversation partner in regard to a common behavior executed by the user and the conversation partner is used as the comparison information, and in a case in which a behavior tendency of the user and a behavior tendency of the conversation partner in regard to a certain common behavior are different from a behavior tendency of public, the topic generation unit generates information regarding the common behavior as the topic.

(9)

The information processing device according to any one of (1) to (8), in which the topic suggestion unit includes a degree-of-animation calculation unit configured to calculate a degree of animation of a communication circumstance formed between the user and the conversation partner, and a topic extraction unit configured to extract a topic corresponding to the degree of animation from the topic generated by the topic generation unit.

(10)

The information processing device according to (9), in which the degree-of-animation calculation unit calculates the degree of animation on the basis of an evaluation function regarding a response of the conversation partner to speech of the user.

(11)

The information processing device according to (9) or (10), in which the topic extraction unit changes a ratio of relevant information relevant to a topic spoken currently in a topic extracted as the topic candidate in accordance with the degree of animation of the communication circumstance with respect to the speech of the user.

(12)

The information processing device according to any one of (9) to (11), in which the topic extraction unit weights each topic generated by the topic generation unit on the basis of state information decided in accordance with a situation in which the user and the conversation partner converse.

(13)

The information processing device according to any one of (9) to (12), in which the topic suggestion unit includes a degree-of-expectation calculation unit configured to calculate a degree of expectation of the communication circumstance becoming animated when a topic is introduced in regard to each topic extracted as the topic candidate, (14)

The information processing device according to any one of (1) to (13), including:

a topic presentation processing unit configured to perform a process of presenting the topic candidate to the user.

(15)

The information processing device according to (14), in which the topic presentation processing unit performs the process of presenting the topic candidate to at least one person participating in a communication circumstance formed between the user and the conversation partner.

(16)

The information processing device according to (14) or (15), in which the topic presentation processing unit performs a process of presenting a progress of a degree of animation of a communication circumstance to at least one person participating in the communication circumstance formed between the user and the conversation partner.

(17)

The information processing device according to any one of (14) to (16), in which the topic presentation processing unit changes an environment setting of a communication circumstance in accordance with a change in a degree of animation.

(18)

An information processing method including: by a processor, generating topics with a conversation partner on the basis of a comparison result between a certain behavior of a user and comparison information regarding the behavior; and deciding a topic candidate to be suggested to the user from the generated topics.

(19)

A program causing a computer to function as an information processing device including a topic generation unit configured to generate topics with a conversation partner on the basis of a comparison result between a certain behavior of a user and comparison information regarding the behavior, and a topic suggestion unit configured to decide a topic candidate to be suggested to the user from the generated topics.

REFERENCE SIGNS LIST 1 topic supply system
110 topic generation unit
112 self-behavior analysis unit
114 common behavior analysis unit
116 profile analysis unit
120 topic suggestion unit
122 degree-of-animation calculation unit
124 topic extraction unit
126 degree-of-expectation calculation unit
130 topic presentation processing unit
140 profile DB
142, 146 user behavior information table
144 behavior tendency table

The invention claimed is:

1. An information processing device comprising:
a topic generation unit configured to
acquire, from the information processing device or another information processing device, comparison information regarding a behavior of a user, the comparison information including sensor information acquired by a sensor, and
generate topics with a conversation partner on the basis of a comparison result between the behavior of the user and the comparison information regarding the behavior; and
a topic suggestion unit configured to decide a topic candidate to be suggested to the user from the generated topics,
wherein the topic suggestion unit includes
a topic extraction unit configured to extract, as the topic candidate to be suggested, a topic corresponding to information related to environment of a communication circumstance formed between the user and the conversation partner from the generated topics, and
weight each topic generated by the topic generation unit on the basis of state information decided in accordance with a timing of a situation in which the user and the conversation partner have a conversation, the state information indicating the timing of the situation in relation to a timing of a common event in which the user and the conversation partner participate,
wherein a behavior tendency of the conversation partner in regard to a certain common behavior executed by the user and the conversation partner is used as the comparison information,
wherein the topic generation unit generates information regarding the common behavior as one of the generated topics, based on each of a behavior tendency of the user in regard to the common behavior and the behavior tendency of the conversation partner in regard to the common behavior being different from a behavior tendency of public, and
wherein the topic generation unit, the topic suggestion unit, and the topic extraction unit are each implemented via at least one processor.

2. The information processing device according to claim 1,
wherein a usual behavior of the user in regard to the behavior is used as the comparison information, and
in a case in which a recent behavior of the user is different from the usual behavior of the user, the topic generation unit generates content of the recent behavior of the user as one of the generated topics.

3. The information processing device according to claim 1,
wherein a previous behavior tendency of the user in regard to the behavior is used as the comparison information, and
in a case in which a recent behavior tendency of the user is changed from the previous behavior tendency of the user, the topic generation unit generates a change in a behavior tendency of the user as one of the generated topics.

4. The information processing device according to claim 1,
wherein a previous behavior tendency of the user in regard to the behavior is used as the comparison information, and
in a case in which a behavior tendency of the user in a certain previous section is different from a behavior tendency of the user in another previous section and a recent behavior tendency of the user, the topic generation unit generates a change in the behavior tendency of the user as one of the generated topics.

5. The information processing device according to claim 1,
wherein a behavior tendency of the conversation partner in regard to a common behavior executed by the user and the conversation partner is used as the comparison information, and
in a case in which a behavior of the user and a behavior tendency of the conversation partner in regard to a certain common behavior are different, the topic generation unit generates information regarding the common behavior as one of the generated topics.

6. The information processing device according to claim 5,
wherein the topic generation unit determines a difference in a behavior between the user and the conversation partner on the basis of an occurrence frequency of the common behavior.

7. The information processing device according to claim 5,
wherein the topic generation unit determines a difference in a behavior between the user and the conversation partner on the basis of subordinate information regarding the common behavior.

8. The information processing device according to claim 1,
wherein the topic suggestion unit further includes a degree-of-animation calculation unit configured to calculate a degree of animation of a communication circumstance formed between the user and the conversation partner,
wherein the topic extraction unit extracts a topic corresponding to the degree of animation from the topic generated by the topic generation unit, and
wherein the degree-of-animation calculation unit is implemented via at least one processor.

9. The information processing device according to claim 8,
wherein the degree-of-animation calculation unit calculates the degree of animation on the basis of an evaluation function regarding a response of the conversation partner to speech of the user.

10. The information processing device according to claim 9,
wherein the topic extraction unit changes a ratio of relevant information relevant to a topic spoken currently in a topic extracted as the topic candidate in accordance with the degree of animation of the communication circumstance with respect to the speech of the user.

11. The information processing device according to claim 8, wherein the topic suggestion unit includes a degree-of-expectation calculation unit configured to calculate a degree of expectation of the communication circumstance becoming animated when a topic is introduced in regard to each topic extracted as the topic candidate.

12. The information processing device according to claim 1, comprising:
a topic presentation processing unit configured to perform a process of presenting the topic candidate to the user,
wherein the topic presentation processing unit is implemented via at least one processor.

13. The information processing device according to claim 12,
wherein the topic presentation processing unit performs the process of presenting the topic candidate to at least one person participating in a communication circumstance formed between the user and the conversation partner.

14. The information processing device according to claim 12,
wherein the topic presentation processing unit performs a process of presenting a progress of a degree of animation of a communication circumstance to at least one person participating in the communication circumstance formed between the user and the conversation partner.

15. The information processing device according to claim 12,
wherein the topic presentation processing unit changes an environment setting of a communication circumstance in accordance with a change in a degree of animation.

16. The information processing device according to claim 1, wherein the comparison information regarding the behavior of the user includes a motion of the user, a location of the motion, and a profile category to which the behavior of the user belongs.

17. The information processing device according to claim 1, wherein the timing includes the situation being before the common event, the situation being during the common event, and the situation being after the common event.

18. The information processing device according to claim 1, wherein, the weight adjusts whether a current topic is continued, a topic is added, or the current topic is switched.

19. The information processing device according to claim 1, wherein the behavior of the user includes a time or a position of an action of the user, and
wherein the comparison information includes a behavior tendency of the user.

20. The information processing device according to claim 1, wherein the sensor information includes temporal information, positional information, or action behavior information of the user.

21. The information processing device according to claim 1, wherein the user and the conversation partner communicate with each other through the information processing device.

22. An information processing method, the method being executed by an information processing device using at least one processor, and comprising:
acquiring, from the information processing device or another information processing device, comparison information regarding a behavior of a user, the comparison information including sensor information acquired by a sensor;
generating topics with a conversation partner on the basis of a comparison result between the behavior of the user and the comparison information regarding the behavior; and
deciding a topic candidate to be suggested to the user from the generated topics,
wherein the deciding of the topic candidate to be suggested includes
extracting, as the topic candidate to be suggested, a topic corresponding to information related to environment of a communication circumstance formed between the user and the conversation partner from the generated topics, and
weighting each of the generated topics on the basis of state information decided in accordance with a timing of a situation in which the user and the conversation partner have a conversation, the state information indicating the timing of the situation in relation to a timing of a common event in which the user and the conversation partner participate,
wherein a behavior tendency of the conversation partner in regard to a common behavior executed by the user and the conversation partner is used as the comparison information, and
wherein information regarding the common behavior is generated as one of the generated topics, based on each of a behavior tendency of the user in regard to the common behavior and the behavior tendency of the conversation partner in regard to the common behavior being different from a behavior tendency of public.

23. A non-transitory computer-readable medium having embodied thereon a program, which when executed by a computer causes the computer to execute a method, the method comprising:

acquiring, from the computer or another computer, comparison information regarding a behavior of a user, the comparison information including sensor information acquired by a sensor;

generating topics with a conversation partner on the basis of a comparison result between the behavior of the user and the comparison information regarding the behavior; and deciding a topic candidate to be suggested to the user from the generated topics, wherein the deciding of the topic candidate to be suggested includes extracting, as the topic candidate to be suggested, a topic corresponding to information related to environment of a communication circumstance formed between the user and the conversation partner from the generated topics, and weighting each of the generated topics on the basis of state information decided in accordance with a timing of a situation in which the user and the conversation partner have a conversation, the state information indicating the timing of the situation in relation to a timing of a common event in which the user and the conversation partner participate, wherein a behavior tendency of the conversation partner in regard to a common behavior executed by the user and the conversation partner is used as the comparison information, and wherein information regarding the common behavior is generated as one of the generated topics, based on each of a behavior tendency of the user in regard to the common behavior and the behavior tendency of the conversation partner in regard to the common behavior being different from a behavior tendency of public.

* * * * *